(12) United States Patent
Murakami

(10) Patent No.: US 7,200,242 B2
(45) Date of Patent: Apr. 3, 2007

(54) IMAGE PROCESSING APPARATUS AND METHOD, COMPUTER PROGRAM, AND COMPUTER-READABLE STORAGE MEDIUM

(75) Inventor: Tomochika Murakami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 779 days.

(21) Appl. No.: 10/600,620

(22) Filed: Jun. 23, 2003

(65) Prior Publication Data

US 2004/0028256 A1 Feb. 12, 2004

(30) Foreign Application Priority Data

Jun. 28, 2002 (JP) .............. 2002-191133

(51) Int. Cl.
*G06K 9/00* (2006.01)

(52) U.S. Cl. .............. 382/100; 382/274; 380/201

(58) Field of Classification Search .............. 382/100, 382/103, 107, 168, 173, 181, 194, 214, 232, 382/235, 243, 248, 260, 263, 274, 276, 305; 358/1.14; 713/176; 380/201
See application file for complete search history.

(56) References Cited

U.S. PATENT DOCUMENTS

| | | | |
|---|---|---|---|
| 6,233,347 B1 * | 5/2001 | Chen et al. .............. | 382/100 |
| 6,738,493 B1 * | 5/2004 | Cox et al. .............. | 382/100 |
| 6,975,746 B2 * | 12/2005 | Davis et al. .............. | 382/100 |
| 6,996,248 B2 * | 2/2006 | Fudge et al. .............. | 382/100 |
| 2001/0017709 A1 * | 8/2001 | Murakami et al. .......... | 358/1.14 |
| 2002/0002679 A1 * | 1/2002 | Murakami et al. .......... | 713/176 |

FOREIGN PATENT DOCUMENTS

| | | |
|---|---|---|
| EP | 0 725 529 A2 | 6/1996 |
| EP | 0 725 529 A2 * | 7/1996 |
| JP | 8-241403 | 9/1996 |
| JP | 8-256321 | 10/1996 |
| JP | 2000-184173 | 6/2000 |

* cited by examiner

*Primary Examiner*—Kanjibhai Patel
*Assistant Examiner*—Seyed Azarian
(74) *Attorney, Agent, or Firm*—Fitzpatrick, Cella, Harper & Scinto

(57) ABSTRACT

This invention can multiplex noise on an original image to reversibly embed visible additional information with a noise-multiplexed distribution, and can generate an image highly resistant to noise removal. For this purpose, when noise is multiplexed on multilevel image data to embed visible additional information with a noise-multiplexed distribution, information representing which of the first and second noise multiplexing processes is performed for each pixel is input as the additional information (S102). The position of a pixel of interest in the multilevel image data is determined on the basis of the additional information (S106). Either of the first noise addition processing (S108) and the second noise addition processing (S110) is performed on the basis of the determination result.

15 Claims, 25 Drawing Sheets

FIG. 9A

FOR S = 1

| | DETERMINATION BIT REGION | | ARITHMETIC BIT REGION | | | | | | Δmax |
|---|---|---|---|---|---|---|---|---|---|
| | B7 | B6 | B5 | B4 | B3 | B2 | B1 | B0 | |
| | 1 | 1 | Y | Y | Y | Y | Y | Y | 63 |
| | 1 | 0 | | Y | Y | Y | Y | Y | 31 |
| | 0 | 1 | | | Y | Y | Y | Y | 15 |
| | 0 | 0 | | | | Y | Y | Y | 7 |

901 is the main table; 902 is the Δmax column.

FIG. 9B

FOR S = 2

| | DETERMINATION BIT REGION | | ARITHMETIC BIT REGION | | | | | | Δmax |
|---|---|---|---|---|---|---|---|---|---|
| | B7 | B6 | B5 | B4 | B3 | B2 | B1 | B0 | |
| | 1 | 1 | | | Y | Y | Y | Y | 15 |
| | 1 | 0 | | | | Y | Y | Y | 7 |
| | 0 | 1 | | | | Y | Y | Y | 3 |
| | 0 | 0 | | | | | | Y | 1 |

FIG. 17A

| PIXEL VALUE | B7 | B6 | B5 | B4 | B3 | B2 | B1 | B0 | Δmax |
|---|---|---|---|---|---|---|---|---|---|
| 255 | | | Y | Y | | | Y | | 50 |
| 254 | | | Y | Y | | | Y | | 50 |
| ⋮ | | | | | | | | | ⋮ |
| 112 | | | | Y | Y | | Y | | 26 |
| ⋮ | | | | | | | | | |
| 1 | | | | | | | Y | | 2 |
| 0 | | | | | | | Y | | 2 |

NEIGHBORING REGION 1701 — ARITHMETIC BIT REGION 1702 — 1703
VISIBLE INTENSITY S = 1

FIG. 17B

| PIXEL VALUE | B7 | B6 | B5 | B4 | B3 | B2 | B1 | B0 | Δmax |
|---|---|---|---|---|---|---|---|---|---|
| 255 | | | | Y | Y | | Y | | 26 |
| 254 | | | | Y | Y | | Y | | 26 |
| ⋮ | | | | ⋮ | ⋮ | | ⋮ | | ⋮ |
| 112 | | | | | Y | Y | | | 12 |
| ⋮ | | | | | | ⋮ | | | ⋮ |
| 1 | | | | | | | Y | | 2 |
| 0 | | | | | | | Y | | 2 |

NEIGHBORING REGION — ARITHMETIC BIT REGION
VISIBLE INTENSITY S = 2

FIG. 21

| VISIBLE INTENSITY VALUE | DWT COEFFICIENT OF NOISE ADDITION TARGET |
|---|---|
| 1 | 1 2 3 4 5 6 7 |
| 2 | 1 2 3 4 |
| 3 | 1 |

2101

F I G. 23

F I G. 24
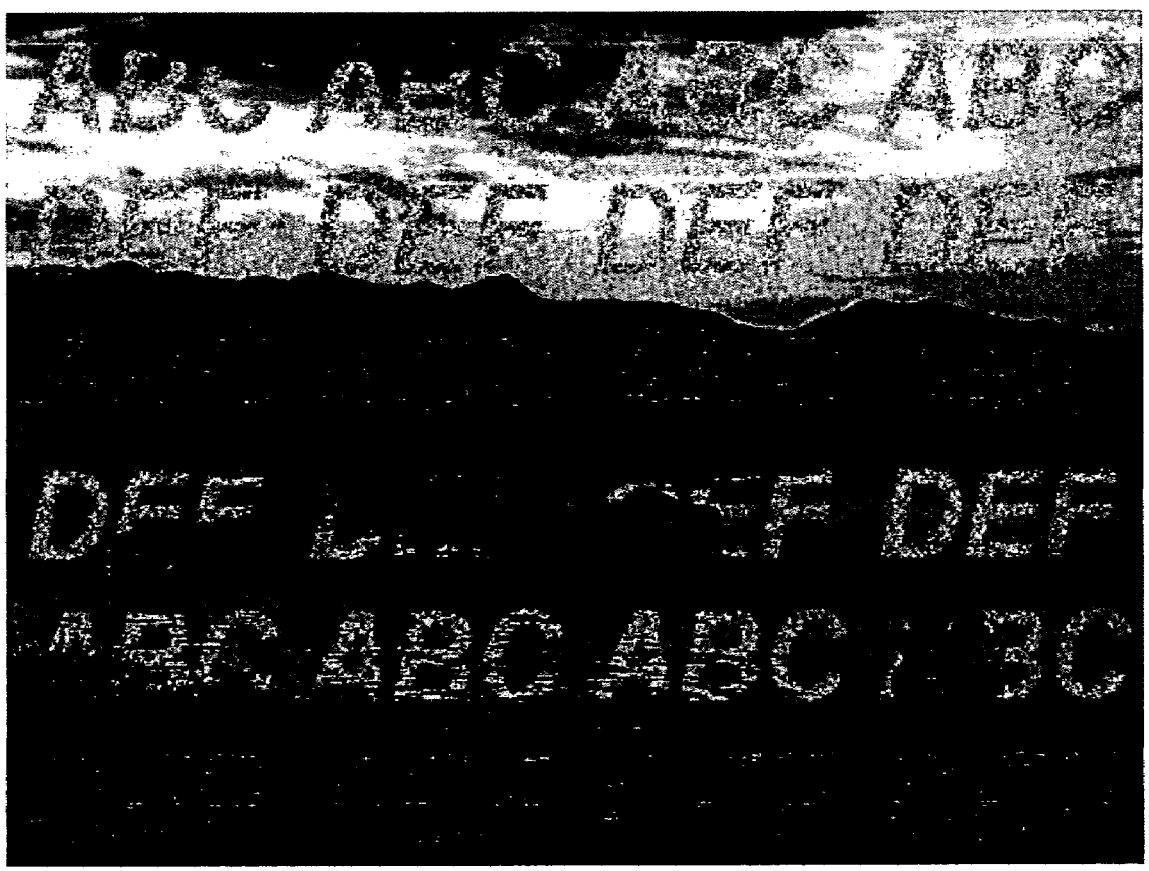

IMAGE PROCESSING APPARATUS AND METHOD, COMPUTER PROGRAM, AND COMPUTER-READABLE STORAGE MEDIUM

FIELD OF THE INVENTION

The present invention relates to an image processing apparatus and method which perform conversion for degrading the image quality and inversion for removing the image quality degradation for digital image data of a still or moving image in order to protect the copyright of the image, a computer program, and a computer-readable storage medium.

BACKGROUND OF THE INVENTION

A digital image used to process an image as digital data can be easily copied by a computer or the like and transmitted via a communication line without degrading the image quality, compared to a conventional analog image. This feature, however, makes it easy to illicitly copy and redistribute a digital image having a copyright or the like.

To prevent this, there is known a digital watermark method. Digital watermarks are roughly classified into an invisible digital watermark obtained by invisibly embedding watermark information such as copyright information or user information, and a visible digital watermark obtained by visibly forming in an image a watermark image such as the logotype of a company having a copyright.

As for the invisible digital watermark, embedded watermark information cannot be recognized or is hardly recognized in an embedded image at a glance. Watermark information is rarely deleted, but is illicitly copied and distributed more frequently than visible watermark information. Even if a digital image is illicitly copied or distributed, watermark information remains in the digital image. An illicit user can be specified by a user ID or the like embedded as the watermark information.

As for the visible digital watermark, watermark information is visibly written in a digital image. It is difficult to directly utilize the digital image, suppressing illicit copying and illicit distribution. As a conventional visible digital watermark embedding method, the pixel value of an image representing copyright information such as the logotype of a copyright holder is replaced with the pixel value of an original image, embedding copyright information in the original image. The drawback of this method is that the original image cannot be reconstructed without difference information because the pixel value of the original image is lost.

Japanese Patent Laid-Open No. 2000-184173 proposes a method of embedding visible watermark image shape information in an image by arithmetic processing (encryption) between all pixels or some bits and an embedding serial sequence at a position where a visible digital watermark is to be embedded. This method can implement a completely reversible visible digital watermark.

Japanese Patent Laid-Open No. 8-256321 proposes a method of extracting part of the bit string of an image which is compression-coded by JPEG or MPEG compression coding, directly converting the extracted bit string by an independently defined conversion method without referring to a part other than the extracted part, and decoding the image. This technique is called "semi-disclosure", and can provide image information to the user while controlling the image quality of the disclosed image information. This method can implement a reversible visible digital watermark by designing a region where a bit string is to be converted.

It is desirable to remove such visible digital watermark by only a specific user having key information and hardly remove it by other users.

However, a visible digital watermark can be removed by the following attack.

Generally in a natural image, neighboring pixel values have a high correlation. Pixel values around a region where a visible digital watermark is embedded are analyzed. The pixel value of the region where the visible digital watermark is embedded is replaced with a value calculated on the basis of neighboring pixel values, thereby removing part of the visible digital watermark. Especially at a flat portion which hardly changes, an embedded visible digital watermark can be readily removed by this method. A conventional visible digital watermark has no proper measure against this attack.

SUMMARY OF THE INVENTION

The present invention has been made to overcome the conventional drawbacks, and has as its object to provide an image processing apparatus and method which can multiplex noise on an original image to reversibly embed visible additional information with a noise-multiplexed distribution, and can generate an image highly resistant to noise removal, a computer program, and a computer-readable storage medium.

It is another object of the present invention to provide an image processing apparatus and method capable of removing additional information from an image on which visible addition information is multiplexed in the above-mentioned manner, thereby reconstructing an original image or an image almost identical to the original image, a computer program, and a computer-readable storage medium.

To achieve the above objects, an image processing apparatus according to the present invention has the following arrangement.

That is, an image processing apparatus which multiplexes noise on multilevel image data to embed visible additional information with a noise-multiplexed distribution comprises first noise multiplexing means for multiplexing noise at a first visible intensity, second noise multiplexing means for multiplexing noise at a second visible intensity different from the first visible intensity, input means for inputting, as the additional information for a predetermined pixel region unit, information representing which of the first and second visible intensities is used for multiplexing, determination means for determining on the basis of the additional information which of the first and second visible intensities is used for multiplexing in a pixel region of interest in multilevel image data, and control means for selecting either of the first and second noise multiplexing means for the pixel region of interest on the basis of a determination result of the determination means, and causing selected noise multiplexing means to multiplex noise.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 9A and 9B are tables showing examples of an arithmetic bit region determination table according to the second embodiment;

FIGS. 17A and 17B are tables showing examples of an arithmetic bit region determination table according to the third embodiment;

FIG. 21 is a table showing the relationship between a visible intensity value and a discrete wavelet transform coefficient having a three relationship with predetermined LL;

FIG. 23 is a view showing an image sample for applying the method of the first embodiment;

FIG. 24 is a view showing an image sample in which a watermark image shape is embedded by applying the method of the first embodiment.

DETAILED DESCRIPTION OF THE PREFERRED EMBODIMENTS

Preferred embodiments of the present invention will be described below with reference to the accompanying drawings.

<Description of Premise>

In the following embodiments, a component used to embed a visible digital watermark is a luminance component which constitutes a color image. Since the color component does not change upon operating the luminance component, the brightness seems to have changed to the human eye. Hence, the luminance component is suitable for embedding a visible digital watermark.

However, a component used to embed a visible digital watermark is not limited to a luminance component. R (Red), G (Green), and B (Blue) components can also be operated with good balance such that a visible digital watermark seems preferable to the human eye while preserving the feature of the image. This also applies to other components (e.g., C (Cyan), M (Magenta), and Y (Yellow)).

For descriptive convenience, an input image is an 8-bit grayscale image. An image comprised of R (Red), G (Green), and B (Blue) color components, or an image comprised of Y (Luminance) and U and V (two color difference components) color components can also be processed by a method according to the embodiments of the present invention.

Figure 22:
FIG. 22 is a view showing an example of watermark image shape information in the embodiment.

FIG. 22 shows an example of watermark image shape information representing a visible digital watermark embedded in an image in the embodiments. FIG. 22 illustrates a simple character string "ABC, DEF". Watermark image shape information can be any image information such as the logotype of a copyright holder, an image photographing date and time, a personal name, a company name, a logotype, or an impressive pattern. Watermark image shape information may be a region of interest (e.g., a morbid portion of a medical image) in an image.

In the present invention, as shown in FIG. 22, watermark image shape information is a mask image having information of 1-bit pixels (binary) which defines positions where first and second visible digital watermarks are embedded (in FIG. 22, a white (=1) alphabet region represents a region where a visible digital watermark is embedded).

<First Embodiment>

The first embodiment of the present invention will be described below with reference to the accompanying drawings.

Figure 25:
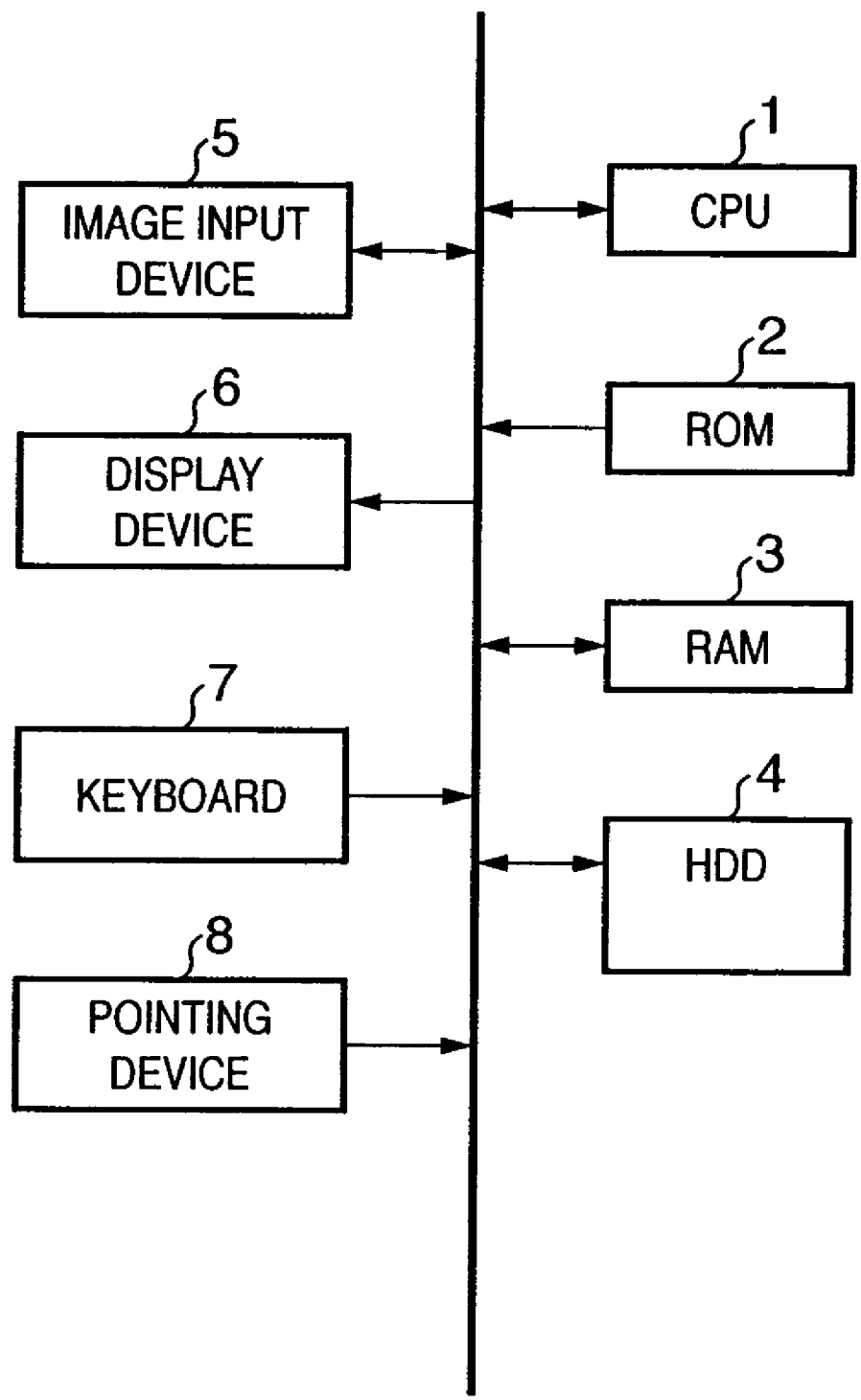
FIG. 25 is a block diagram showing an apparatus according to the embodiment.

FIG. 25 is a block diagram showing an information processing apparatus which processes an image in the first embodiment. In FIG. 25, reference numeral 1 denotes a CPU which controls the whole apparatus; 2, a ROM which stores a boot program, BIOS, and the like; and 3, a RAM used as a work area for the CPU 1. An OS, image processing program, or the like is loaded to the RAM 3 and executed. Reference numeral 4 denotes a hard disk device serving as an external storage device for storing an OS, image processing program, and image data files (including files before and after processing); 5, an image input device such as an image scanner, a digital camera, a storage medium (memory card, flexible disk, CD-ROM, or the like) which stores an image file, or an interface for downloading an image from a network; 6, a display device which displays an image and provides GUI for performing various operations; 7, a keyboard; and 8, a pointing device used to designate a desired position on a display screen and select various menus.

The apparatus having the above arrangement is powered on, and the OS is loaded to the RAM 3. An image processing program in the first embodiment is loaded to the RAM 3 and executed in accordance with a user instruction or automatic activation setting.

Figure 1:
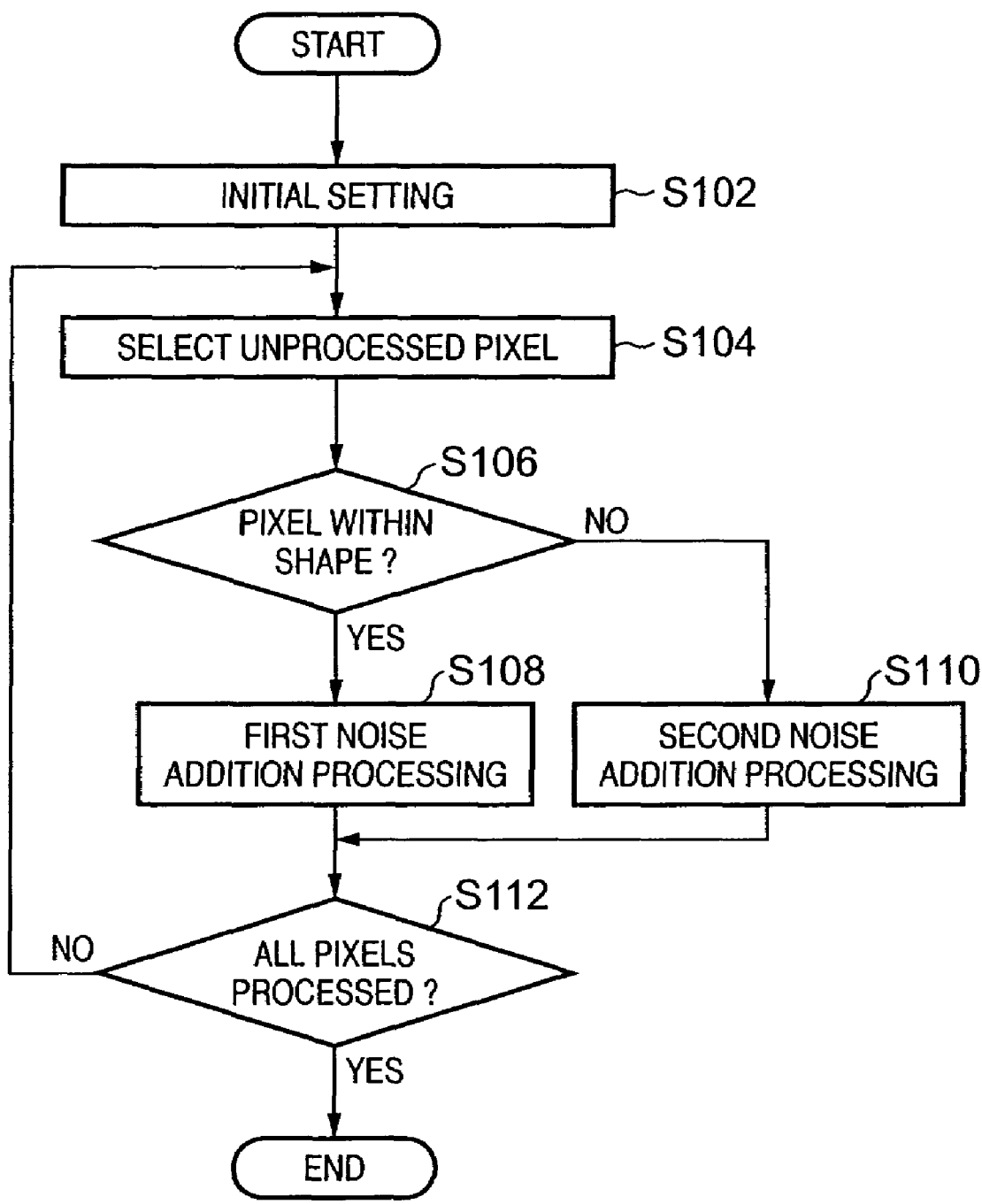
FIG. 1 is a flow chart showing visible digital watermark embedding processing according to an embodiment.

FIG. 1 is a flow chart showing reversible noise addition processing as image processing according to the first embodiment of the present invention.

In step S102 of FIG. 1 as the initial setting step, an original image I comprised of a plurality of pixels each having a pixel position and pixel value, watermark image shape information M comprised of a pixel position representing the shape of a region where noise is added to an image, random number keys R1 and R2 for generating a predetermined serial bit sequence expressed by binary numbers, visible intensity values S1 and S2 which define the intensity of noise to be added, and an output image W identical to the input original image I are set.

The original image I may be an image directly input from the image input device 5 or an image file temporarily saved in the HDD 4. The image shape information M is in formation stored in the HDD 4 in advance, but may be freely created by the user. As for the random number keys R1 and R2, a function (program) for generating a random number may be executed. The visible intensity values S1 and S2 may be input from the keyboard or the like, or may be saved as a file in the HDD in advance. The output destination of the output image W is the HDD 4. The serial bit sequence may be fixed for the entire image, but is changed in accordance with the image embedding position on the basis of the random number keys R1 and R2 in order to enhance security.

In step S102, specific pixels in the original image I are sequentially selected prior to the following processing. As the selection order, the upper left corner of the original image I is set as the start position, and one horizontal line is scanned right from the start position. At the end of the line, the next line (second line) is scanned from left to right. This scanning is repeated. This also applies to noise removal, the following embodiments, and image shape information. When image shape information is smaller than the original image, the image shape information is repetitively used.

In step S104, an unprocessed pixel of the input image is selected. In step S106, a position in watermark image shape information that corresponds to the pixel position, i.e., whether the pixel is located at position "1" in image shape information (within a white character in FIG. 22) or position "0" (black region in FIG. 22) is determined. If the pixel is determined to fall within the shape information (white pixel position), processing advances to step S108 to perform the first noise addition processing (noise multiplexing processing); if NO, to step S110 to perform the second noise addition processing (noise multiplexing processing).

In the first noise addition processing of step S108, the first noise addition processing is executed on the basis of the random number key R1 and visible intensity value S1 set in step S102. In the second noise addition processing of step S110, the second noise addition processing is executed on the basis of the random number key R2 and visible intensity value S2 set in step S102.

After either processing, processing advances to step S112. Step S108 or S110 continues until noise addition processing is determined to end for all the pixels of the input image.

The outline of reversible noise addition processing according to the first embodiment has been described. Reversible noise removal processing procedures of removing noise from a reversible noise-added image will be described with reference to FIG. 2. The arrangement of an apparatus which removes noise is substantially the same as that shown in FIG. 2, and a detailed description thereof will be omitted.

Figure 2:
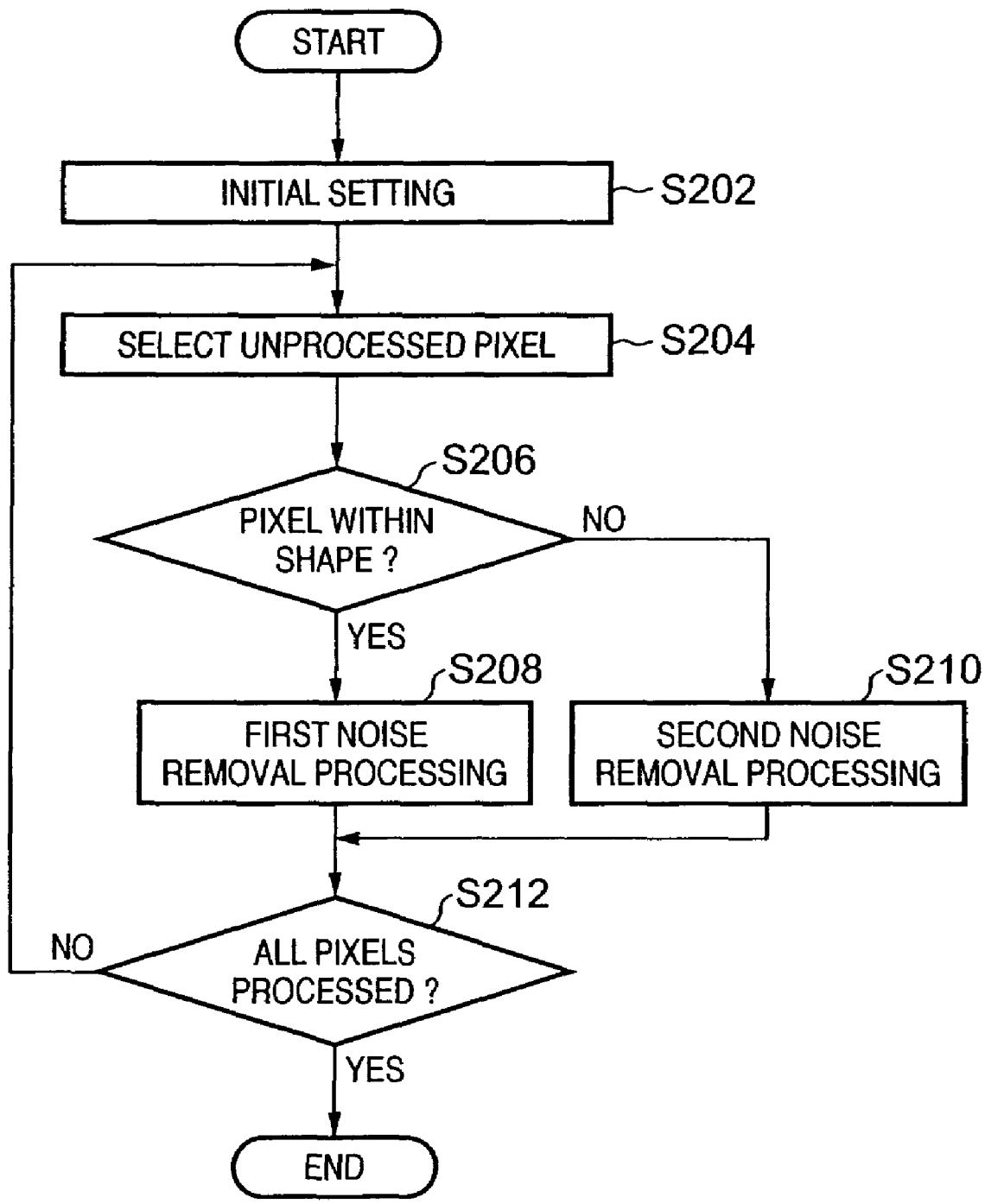
FIG. 2 is a flow chart showing visible digital watermark removal processing according to the embodiment.

In step S202 of FIG. 2, initial setting is performed. An original image I comprised of a plurality of pixels each having a pixel position and pixel value, watermark image shape information M comprised of a pixel position representing the shape of an embedded image, random number keys R1 and R2 for generating a predetermined serial bit sequence expressed by binary numbers, different visible intensity values S1 and S2 which define the intensity of a visible digital watermark, and an output image W identical to the input original image I are set. R1 and R2 may be the same key or different keys. The original image I is constituted by sequentially aligning pixel data of each line in the main scanning direction with a defined number of main scanning pixels × a defined number of subscanning pixels. When attention is paid to given pixel data, the pixel position is determined by itself. The original image uses a pixel position as one of pieces of building information because the "pixel position" is convenient.

In step S204, an unprocessed pixel of the input image (noise-multiplexed image) is selected.

In step S206, a position in watermark image shape information that corresponds to the position of the selected pixel, i.e., whether the pixel is located at position "1" in image shape information (within a white character in FIG. 22) or position "0" (black region in FIG. 22) is determined. If the pixel is determined to fall within the shape information (white pixel position), processing advances to step S208 to perform the first noise removal processing; if NO, to step S210 to perform the second noise removal processing.

In step S212, whether all pixels have been processed is determined. If NO in step S212, processing returns to step S204 to continue the above-described processing until all pixels have been processed.

The outline of visible digital watermark removal processing according to the first embodiment has been described.

Internal processing of the first noise addition processing (step S108) and second noise addition processing (step S110) in the first embodiment will be described in detail.

The first noise addition processing and second noise addition processing are executed on the basis of the same principle, but noise may be added on the basis of different principles. In short, added noise components suffices to be perceived as different noise components by the human eye (in the first embodiment, the visible intensity values S1 and S2 are used to add noise components with different intensities to an image, and noise components with different perceived intensities are multiplexed).

The feature of the first embodiment is to change added noise between the first and second noise addition processes and explicitly present the watermark image shape to the image appreciator.

Figure 3:
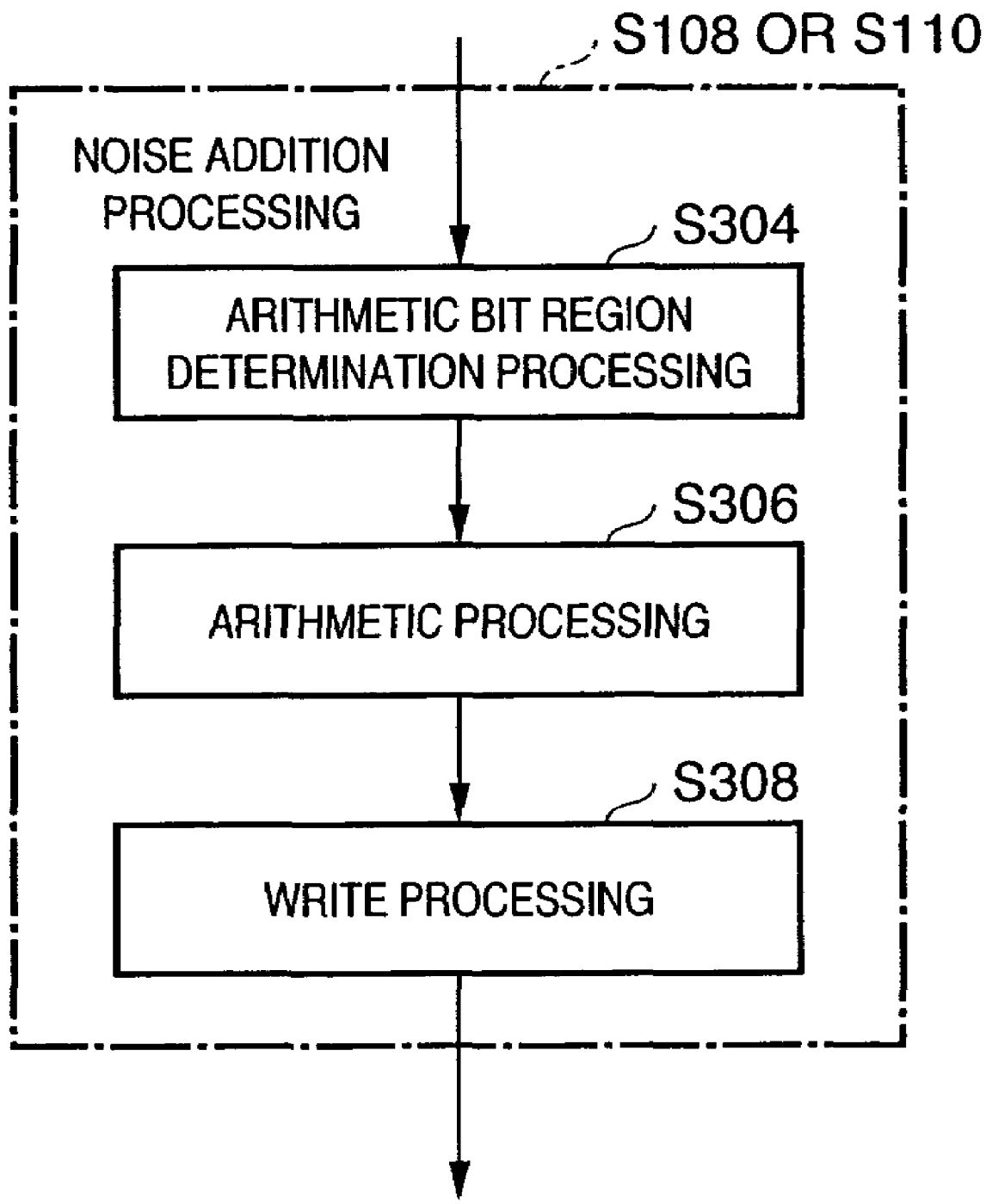
FIG. 3 is a flow chart showing noise addition processing according to the first embodiment.

FIG. 3 is a flow chart showing the internal processing procedures of the first and second noise addition processes according to the first embodiment.

In noise addition processing, an arithmetic bit region is determined in accordance with the visible intensity value S (S1 or S2) in arithmetic bit region determination processing (step S304).

In arithmetic processing 306, predetermined arithmetic processing is executed between the bit value of the selected arithmetic bit region and a serial bit sequence generated from the random number key R (R1 or R2).

In write processing (step S308), the arithmetic result of arithmetic processing (step S306) is written in the arithmetic bit region of the selected pixel.

Figure 4:
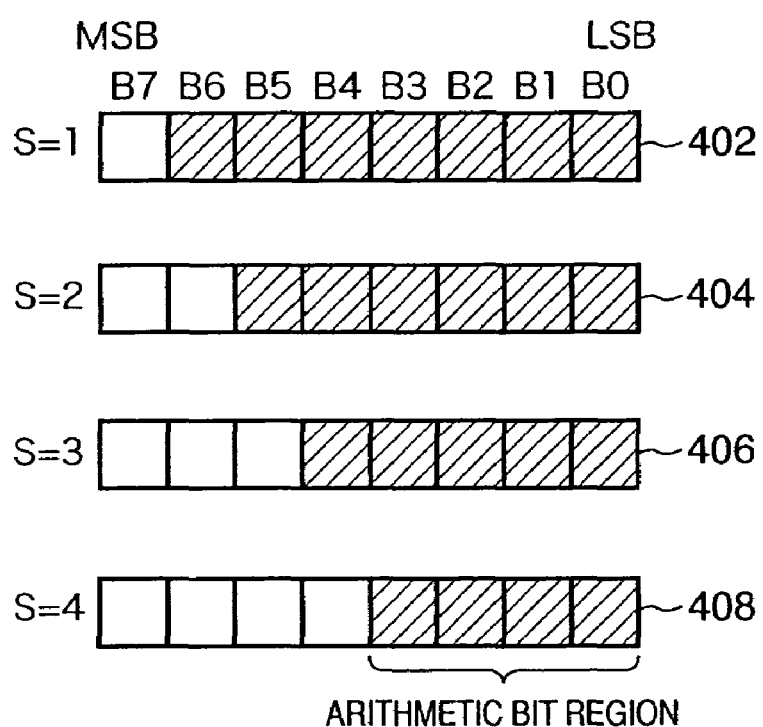
FIG. 4 is a view showing an arithmetic bit region according to the first embodiment.

FIG. 4 is a view showing the relationship between the visible intensity value and the arithmetic bit region. In FIG.

4, reference numerals 402, 404, 406, and 408 denote 8-bit pixel values (in this case, the luminance component value of each pixel) expressed by binary bits. The MSB (Most Significant Bit) is B7, the LSB (Least Significant Bit) is B0, and intermediate bits are B6, B5, B4, B3, B2, and B1 in a descending order.

In FIG. 4, 7 bits starting from B6 except the MSB are designated as an arithmetic bit region for a visible intensity value "1", as represented by 402 (this means that the MSB is invariant). Six bits starting from B5 for a visible intensity value "2", 5 bits starting from B4 for a visible intensity value "3", and 4 bits starting from B3 for a visible intensity value "4" are designated as an arithmetic bit region, as represented by 404, 406, and 408. At S=2 to 4, upper "white" bits are invariant (=not subjected to arithmetic processing).

In the relationship shown in FIG. 4, the ratio of changing the luminance increases for a larger arithmetic bit region (size), and the change amount with respect to an original image becomes relatively large.

The first and second noise addition processes in the first embodiment are so designed as to change the arithmetic bit region in accordance with the visible intensity value S. For example, the visible intensity value S1 in the first noise addition processing adopts S=2 in FIG. 4, and the visible intensity S2 in the second noise addition processing adopts S=4 in FIG. 4. As a result, noise having a high visible intensity is multiplexed on the white portion of image shape information shown in FIG. 22, giving a change to a visible degree. The visible intensity is low at the black portion of the image shape information, the change amount is relatively small, and the change is less conspicuous. Most of a portion added to an original image is the black portion of the image shape information. At this portion, the visible intensity is set low so as not to impair the atmosphere of an original image.

Figure 5:
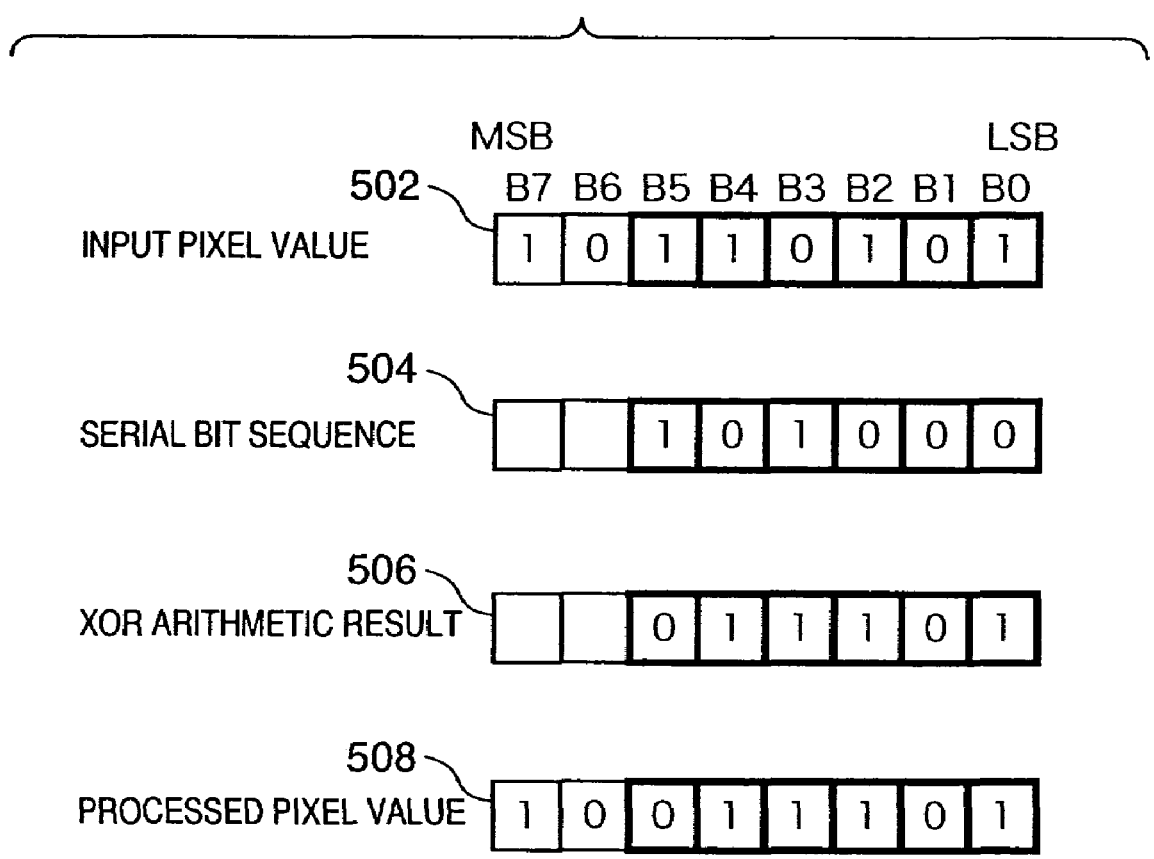
FIG. 5 is a view showing arithmetic processing contents.

The outline of internal processing of arithmetic processing (step S306) will be explained with reference to FIG. 5. FIG. 5 shows a case for the visible intensity S=2.

Reference numeral 502 denotes an input pixel value; 504, a serial bit sequence generated from the random number key R (R1 or R2); 506, an exclusive-OR (XOR) of an input pixel and a corresponding bit position in a serial bit sequence; and 508, an output pixel having undergone arithmetic processing.

The serial bit sequence 504 serves as a noise addition key and a key for decoding a pixel. A region other than the arithmetic bit region is not subjected to arithmetic processing, and a corresponding serial bit sequence is not required (even if such region exists, it is ignored).

A value in the thick frame in the exclusive-OR 506 is the arithmetic processing result (in this case, exclusive-OR) of the arithmetic bit region of an input pixel and the bit region of a corresponding serial bit sequence (random number).

The output pixel 508 is a result of writing the arithmetic processing result 506 as the value of the arithmetic bit region of a corresponding input pixel.

In FIG. 5, the difference between the pixel value of the arithmetic result and the original pixel value (B means a binary number in the following description) is

10011101(B)−10110101(B)=157−181=−24

This means that the pixel value of interest has changed by "−24".

When 6 bits B5, B4, B3, B2, B1, and B0 form an arithmetic bit region and the entire arithmetic bit region is inverted, a pixel value change of $2^5+2^4+2^3+2^2+2^1+2^0=32+16+8+4+2+1=63$ ($x^y$ represents the yth power of x) is realized at maximum. By designating an arithmetic bit region, the maximum amount of the pixel value which changes by arithmetic processing can be determined. It can be easily understood that the visible intensity value is an index representing a noise amount generated by noise addition processing.

Figure 6:
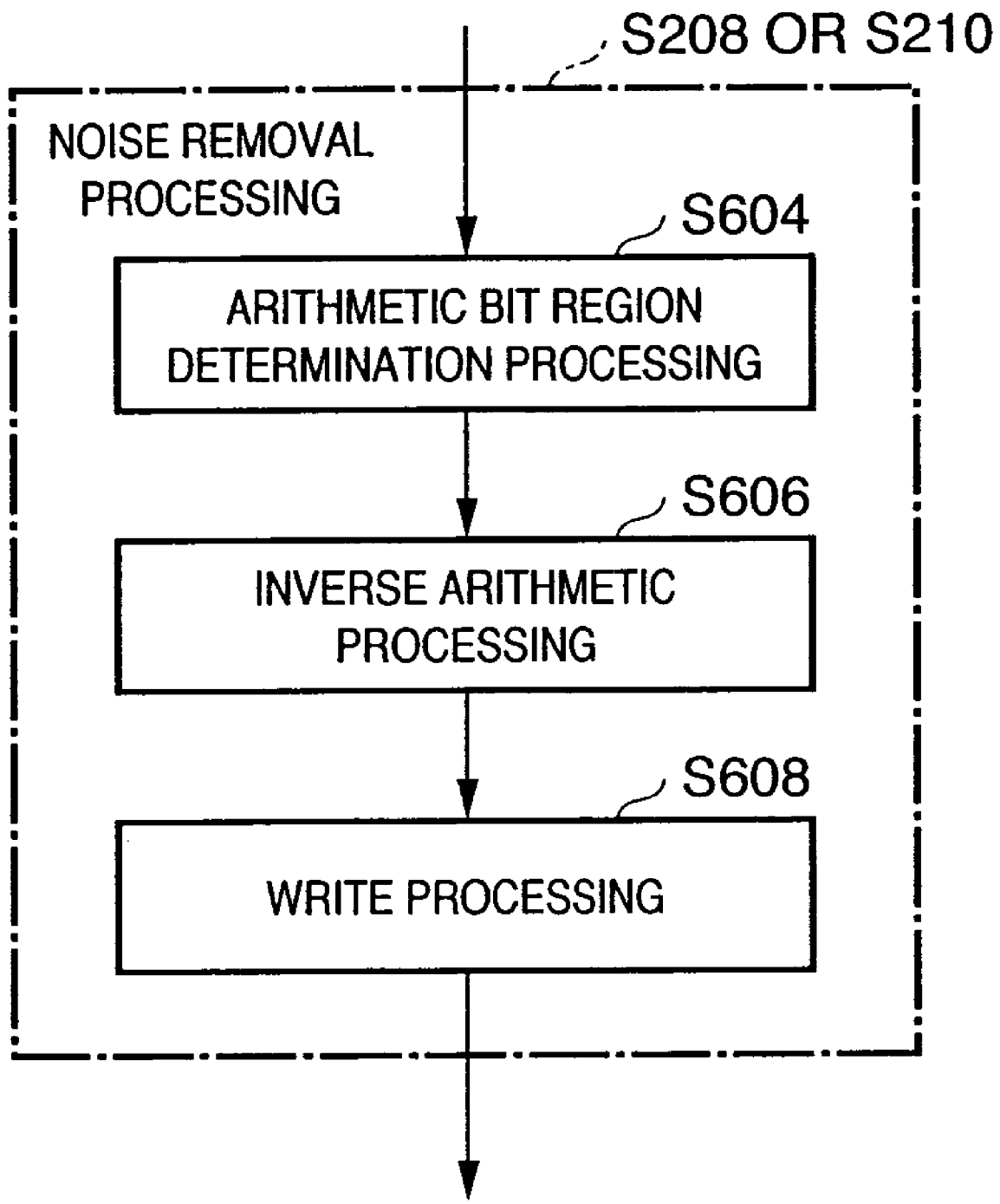
FIG. 6 is a flow chart showing noise removal processing according to the first embodiment.

FIG. 6 is a flow chart showing the internal processing procedures of the first noise removal processing (step S208) and second noise removal processing (step S210) in the visible digital watermark removal apparatus in FIG. 2.

Noise can be removed by almost the same procedures as those in FIG. 3, and noise removal processing will be briefly explained.

In noise removal processing, an arithmetic bit region is determined in accordance with the visible intensity S (S1 or S2) in arithmetic bit region determination processing (step S604).

In arithmetic processing (step S606), predetermined arithmetic processing (reconstruction processing) is executed between the bit value of the selected arithmetic bit region and a serial bit sequence generated from the random number key R (R1 or R2). The image can be reconstructed because the pixel value can be completely restored to an "input pixel value" in FIG. 5 by calculating the exclusive-OR of a processed pixel value and serial bit sequence in the example of FIG. 5.

In write processing (step S608), the arithmetic result of arithmetic processing (step S606) is written in the arithmetic bit region of the selected pixel.

Noise removal processing according to the first embodiment has been described.

In the first embodiment, arithmetic processing (encryption) is performed inside and outside the watermark image shape by using different visible intensity values S1 and S2 in the first and second arithmetic processes.

The noise amount is set different between the first region (inside the watermark image shape) and the second region (outside the watermark image shape) though the entire image undergoes arithmetic processing (encryption). Thus, watermark image shape information can be presented to the image user.

At this time, as the difference between the visible intensity values S1 and S2 is larger, watermark image shape information can be presented to the image user more clearly.

Image shape information shown in FIG. 22 is a simple character string "ABC, DEF" in two lines for descriptive convenience. In practice, for example, the creator name or photographer name of an original image is visibly added (multiplexed). A background portion (portion corresponding to the black portion in FIG. 22) is large in area, and is desirably so designed as not to impair the atmosphere of an original image. The visible intensity S2 applied to the background portion is desirably lower than the visible intensity S1 at an additional information portion. From this viewpoint, S1=S=1 and S2=S=4 are desirable in the example of FIG. 4.

In the first embodiment, the entire image undergoes arithmetic processing (encryption) by embedding a visible digital watermark. Such image is resistant to a conventional attack of calculating the pixel of a visible digital watermark region having undergone arithmetic processing from surrounding pixels and removing the visible digital watermark.

In the first embodiment, predetermined arithmetic processing is executed inside and outside the watermark image shape. To make watermark removal difficult, it is also possible to execute predetermined arithmetic processing inside and around the watermark image shape and inhibit arithmetic processing in the remaining region.

The first embodiment can simultaneously achieve two purposes:

(1) to present watermark image shape information to the image user; and (2) to make removal of watermark image shape information difficult.

Concrete examples of this method are as follows.

A server which services images on the Internet is installed. Images containing additional information having undergone processing in FIG. 1, and pieces of specific information (image shape information M, visible intensity values S1 and S2, and random number keys R1 and R2) for reconstructing the respective images are stored and managed. The user (client) selects and downloads a desired image. The downloaded image contains visible additional information (e.g., a photographer name and photographing date and time), as described above, and can satisfactorily present the atmosphere of the entire image. The user notifies the server that he/she wants to reconstruct the downloaded image into an original image (e.g., by clicking a corresponding button on a browser or the like). The server transmits not the original image itself but pieces of key information (image shape information M, random number keys R1 and R2, and visible intensity values S1 and S2 (or information which designates an arithmetic bit region size in each image)) which are specific to the image and necessary for reconstruction (this can prevent leakage of the original image). In transmission, these pieces of information are encrypted by a private key, which enhances security. The user PC receives these pieces of information, and performs processing of executing processing shown in FIG. 2.

As for the random number keys R1 and R2, a common function for generating a random number is held in the server and client, instead of transmitting a random number itself. Only an initial parameter. for generating a random number is transmitted. If the same parameter is used for all images, all images held by the server can be undesirably reconstructed. To prevent this, the parameter is changed for each image.

In an application to a medical image (e.g., X-ray fluoroscopic image), image shape information corresponding to a region representing a morbid portion is prepared in advance. In this case, large noise is multiplexed on the morbid portion, and small noise is multiplexed onside the morbid portion. This can prevent leakage of personal information.

<Second Embodiment>

In the first embodiment, the noise amount added inside and outside the watermark image shape is constant regardless of the pixel value and changes in accordance with the visible intensity value.

A reversible visible digital watermark which is difficult to remove can also be implemented using noise processing according to the second embodiment. The second embodiment is different from the first embodiment in that the arithmetic bit region in noise addition processing and noise removal processing changes in accordance with the pixel value.

The human visual characteristic is more sensitive to a change in luminance value at a lower luminance value and less sensitive to a change in luminance value at a higher luminance value. The second embodiment utilizes this characteristic.

The basic processing procedures of visible digital watermark embedding and removal are the same as those of the first embodiment in FIGS. 1 and 2, and a description thereof will be omitted. The first and second noise addition processes according to the second embodiment will be explained.

Figure 7:
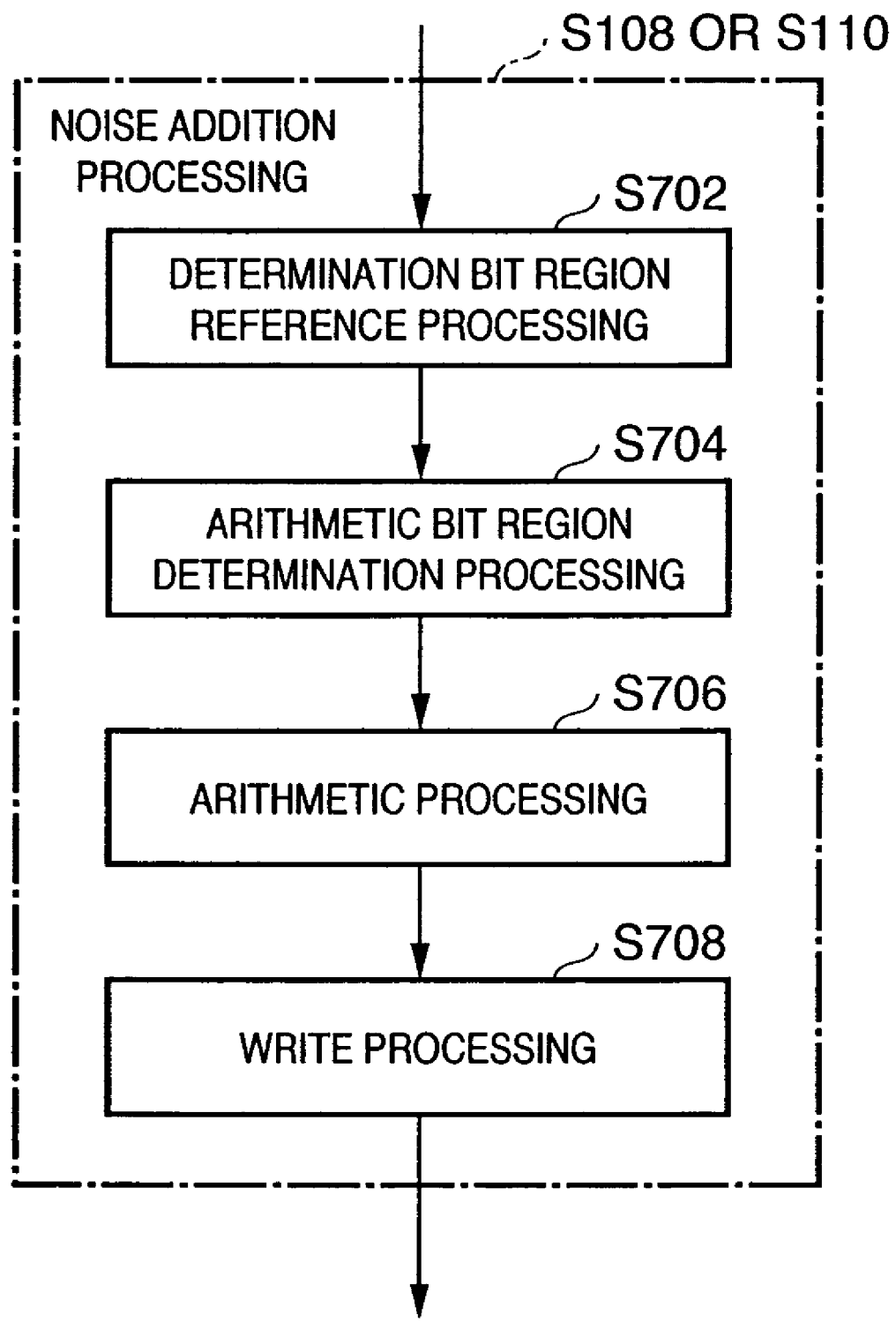
FIG. 7 is a flow chart showing noise addition processing according to the second embodiment.

FIG. 7 is a flow chart showing the processing procedures of noise addition processing according to the second embodiment.

A determination bit region is referred to in step S702, and an arithmetic bit region is determined on the basis of the bit value of the determination bit region and the visible intensity value in step S704. Arithmetic processing is performed for the arithmetic bit region in step S706, and processing of writing the arithmetic processing result in the arithmetic bit region of the pixel of an output image is executed in step S708.

The determination bit region and arithmetic bit region according to the second embodiment will be explained.

Figure 8:
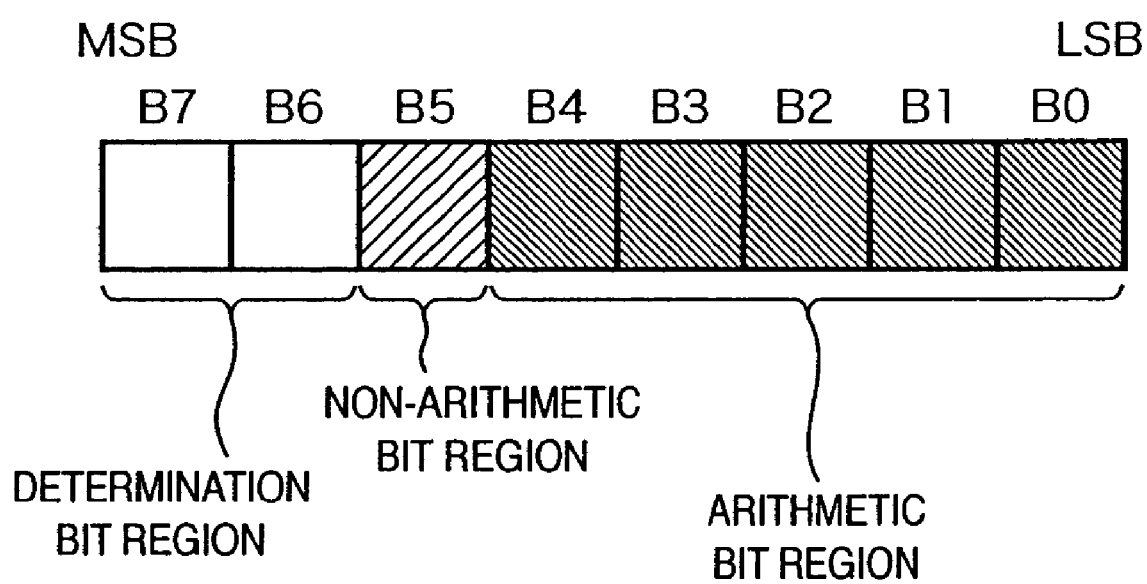
FIG. 8 is a view showing an example of a determination bit region, arithmetic bit region, and non-arithmetic bit region according to the second embodiment.

FIG. 8 is a view showing an 8-bit pixel value (in this case, the luminance component value of each pixel) expressed by bits. The MSB (Most Significant Bit) is B7, the LSB (Least Significant Bit) is B0, and intermediate bits are B6, B5, B4, B3, B2, and B1 in a descending order.

The determination bit region, arithmetic bit region, and non-arithmetic bit region shown in FIG. 8 will be briefly explained. The determination bit region is a bit region referred to in order to determine an arithmetic bit region. The arithmetic bit region is a bit region subjected to predetermined calculation in order to add noise. The non-arithmetic bit region is a bit region subjected to no operation.

In the second embodiment, the determination bit region (determination) is fixed (2 bits MSB (B7) and B6) in the first or second noise addition processing. The determination bit region is comprised of B7 and B6 in order to preserve the atmosphere of an original image because the component value of an original image is dominant for a larger bit position.

In determination bit region reference processing in step S702 of FIG. 7, the bit value of the determination bit region is read out. In other words, the rough value (rough luminance value) of an 8-bit target pixel is referred to. In step S702, the arithmetic bit region and non-arithmetic bit region are not determined yet.

FIGS. 9A and 9B show examples of an arithmetic bit region determination table T used in arithmetic bit region determination processing of step S704. FIG. 9A shows a table for the visible intensity S1, and FIG. 9B shows a table for the visible intensity S2.

In an arithmetic bit region determination table 901, the bit value of the determination bit region (B7 and B6) is defined in correspondence with the arithmetic bit region. A bit position "Y" in the arithmetic bit region of the arithmetic bit region determination table 901 represents an arithmetic bit region, and a blank bit position represents a non-arithmetic bit region. That is, the arithmetic bit region is given by the function of the bit value of the determination bit region. As shown in FIGS. 9A and 9B, the visible intensity S2 is assigned a smaller arithmetic bit region than that for S1 (the arithmetic bit region shifts to the lower bit side). This means that noise is multiplexed at the visible intensity S2 in a state more similar to an original image.

For example, when the arithmetic bit region determination table 901 is referred to for the bit value of B7=1 and the bit value of B6=0 at a predetermined visible intensity value, the arithmetic bit region is defined by B4, B3, B2, B1, and B0 in FIG. 9A (visible intensity S1). Under the same conditions, the arithmetic bit region is defined by B2, B1, and B0 in FIG. 9B. In either case, the arithmetic bit region is larger for a higher luminance and smaller for a lower luminance. The arithmetic bit region is set in accordance with the human visual characteristic which is more sensitive to a change in luminance value at a lower luminance value and less sensitive to a change in luminance value at a higher luminance value, as described above.

Figure 10:
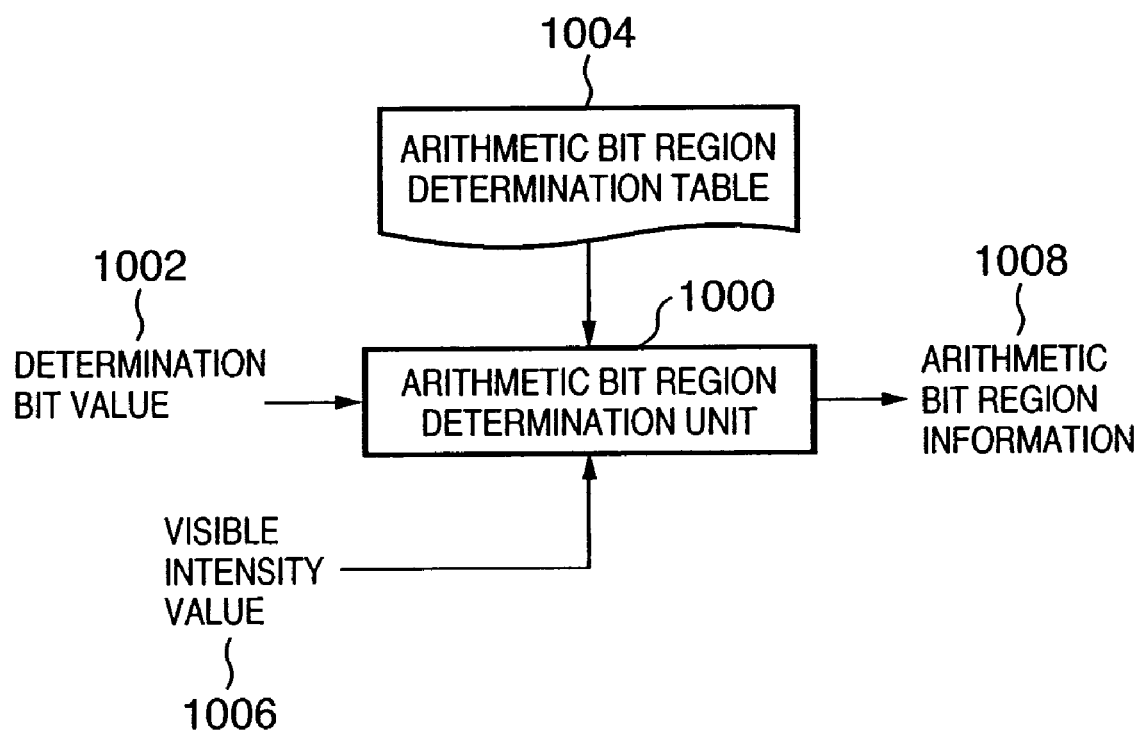
FIG. 10 is a block diagram showing the internal arrangement of an arithmetic bit region determination unit which executes arithmetic bit region determination processing according to the second embodiment.

FIG. 10 is a block diagram showing an arithmetic bit region determination unit which executes arithmetic bit region determination processing of step S704. The following description concerns the visible intensity S1, and also applies to the visible intensity S2 except that the contents of a table 1004 are those in FIG. 9A or those in FIG. 9B.

An arithmetic bit region determination unit 1000 receives a bit value 1002 of the determination bit region from the determination bit region reference processing means in step S702, and the initially set visible intensity value S (in this case, S1) and arithmetic bit region determination table T.

As described above, the arithmetic bit region determination unit 1000 determines an arithmetic bit region on the basis of the bit value of the determination bit region, the arithmetic bit region determination table T, and the visible intensity value S, and outputs the arithmetic bit region as arithmetic bit region information.

Figure 11:
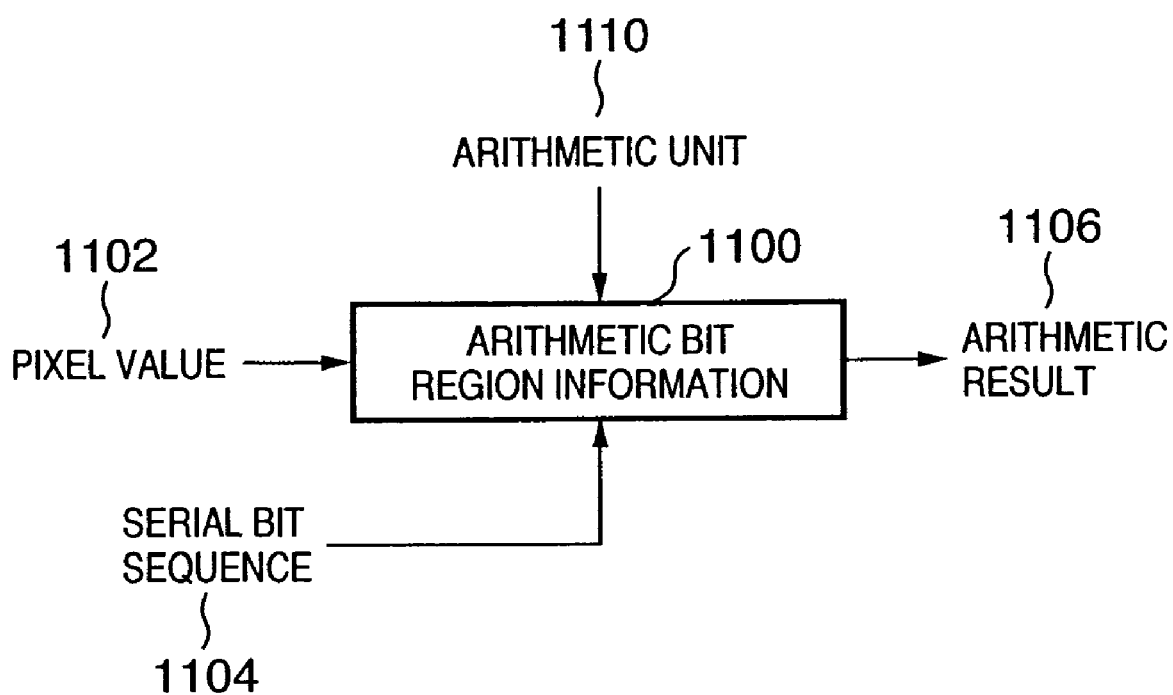
FIG. 11 is a block diagram showing the internal arrangement of an arithmetic unit which executes arithmetic processing according to the second embodiment.

FIG. 11 is a block diagram showing an arithmetic unit which executes arithmetic processing of step S706.

An arithmetic unit 1100 receives an input pixel value 1102 to be processed, a serial bit sequence 1104 which is generated from the random number key R (in this case, R1) and changes depending on the position, and arithmetic bit region information 1110 determined in step S704. The arithmetic means 1100 executes arithmetic processing (e.g., exclusive-OR) on the basis of predetermined reversible arithmetic processing, and outputs an arithmetic result 1106.

An example of the operation of the arithmetic unit 1100 will be described with reference to FIG. 5. Although the description is repetitive, reference numeral 502 denotes an input pixel value; 504, a serial bit sequence generated from the random number key R; 506, an exclusive-OR (XOR) of an input pixel and a corresponding bit position in a serial bit sequence; and 508, an output pixel having undergone arithmetic processing.

An arithmetic bit region is determined by referring to the determination bit region of the input pixel 502. A bit position surrounded by the thick frame in the input pixel 502 is an arithmetic bit region. The serial bit sequence 504 serves as a key for decoding a pixel. A serial bit sequence corresponding to a region other than the arithmetic bit region is not required (or does not exist).

A value in the thick frame in the exclusive-OR 506 is the arithmetic processing result (in this case, exclusive-OR) of the arithmetic bit region of an input pixel and the bit region of a corresponding serial bit sequence.

The output pixel 508 is a result of writing the arithmetic processing result 506 as the value of the arithmetic bit region of a corresponding input pixel.

In this manner, the second embodiment introduces processing of determining an arithmetic bit region from the determination bit region. Part of image information can be saved, and at the same time the maximum change amount (Δmax) of the pixel value can be determined in accordance with the pixel value of an original image.

In FIG. 9A, reference numeral 902 denotes a maximum change amount (Δmax) of a pixel value corresponding to the arithmetic bit region determination table 901.

The arrangement and operation at the visible intensity S2 can be easily understood from the above description, and a description thereof will be omitted.

The randomized effect of the bit of the arithmetic bit region by arithmetic processing in step S706 of FIG. 7 is predicted. By determining an arithmetic bit region, a random luminance change within the maximum change amount Δmax can be realized within the watermark image shape region where noise is added.

As described above, the human visual characteristic is more sensitive to a change in luminance value at a lower luminance value and less sensitive to a change in luminance value at a higher luminance value. The arithmetic bit region (maximum change amount Δmax) is preferably designed in consideration of the human visual characteristic.

In FIGS. 9A and 9B, the arithmetic bit region determination table is designed in consideration of the human visual characteristic, suppressing the image quality degradation.

Uniform color spaces CIE 1976 L*u*v* and CIE 1976 L*a*b* (to be referred to as an L*a*b* color space hereinafter) in which a color change in the space coincides with a change in color appearance have been recommended by CIE since 1976.

The uniform color space is also effective for determining the maximum change amount Δmax.

Noise removal processing according to the second embodiment will be described.

Figure 12:
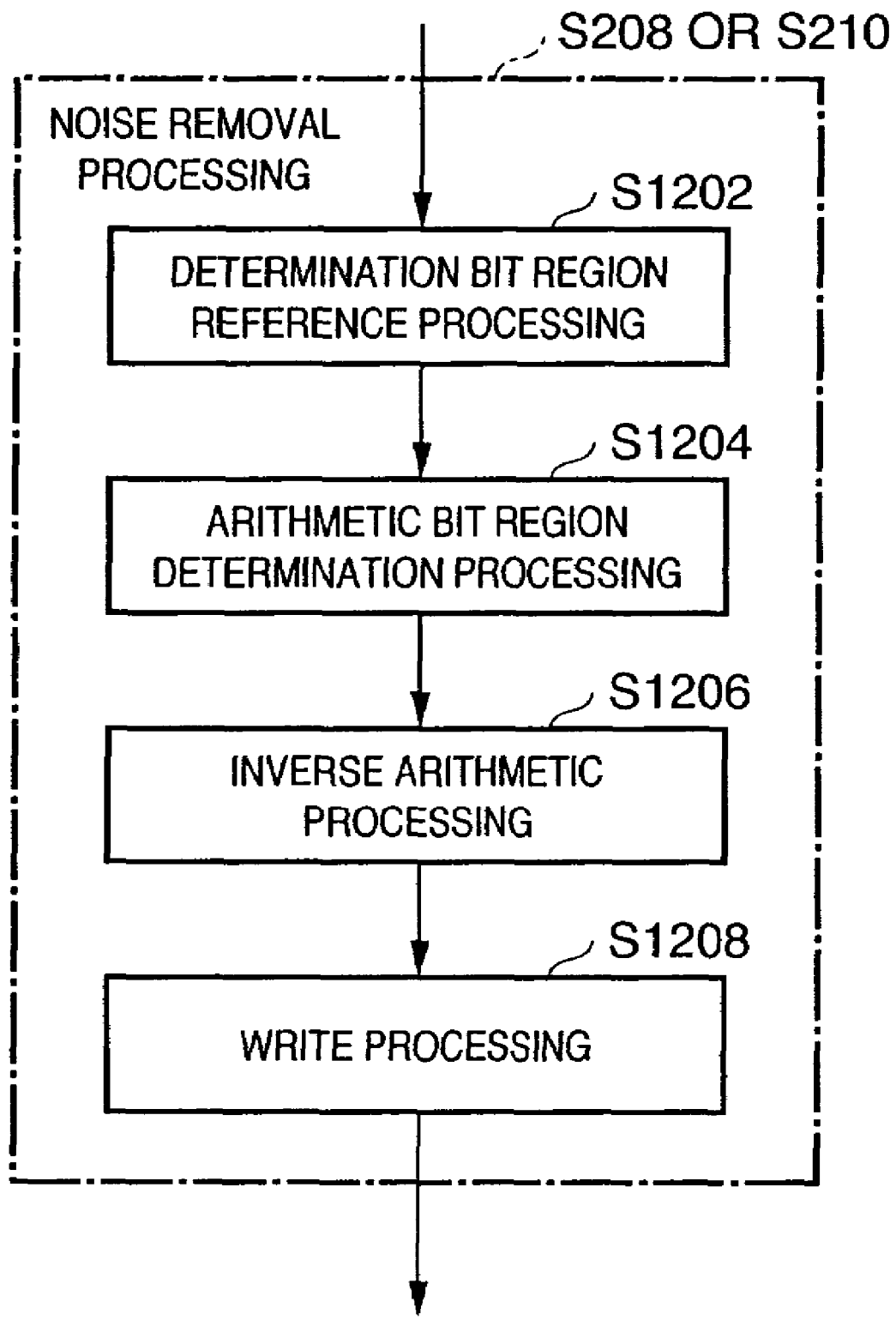
FIG. 12 is a flow chart showing noise removal processing according to the second embodiment.

FIG. 12 is a flow chart showing noise removal processing according to the second embodiment. Noise removal processing according to the second embodiment can be realized by almost the same processing as noise addition processing.

In step S1202, bit information of a determination bit region in the pixel value of a designated original image is read out (at this time, whether the position of a pixel of interest falls within the white or black region of image shape information has already been determined).

In step S1204, an arithmetic bit region to be processed in arithmetic processing of step S1206 is determined on the basis of the determination bit region value read out in step S1202.

In step S1206, inverse arithmetic processing is performed between the bit of the arithmetic bit region determined in step S1204 and a serial bit sequence generated from the random number key input by initial setting. This arithmetic processing is inverse arithmetic processing (decoding processing) corresponding to arithmetic processing in embedding.

In step S1208, write processing of writing the value of the bit region of a corresponding input pixel in the output image E by the value of the processed arithmetic bit region is executed.

The operation of noise removal processing according to the second embodiment has been described.

In addition to the effects of the first embodiment, the second embodiment can set the pixel value change amount such that the noise amount added by arithmetic processing changes in accordance with the image grayscale in a region represented by watermark image shape information of an original image while maintaining the feature of an original image. The arithmetic bit region determination table T is used to determine an arithmetic bit region. An arithmetic bit region determination function F expressed by a formula can also be used, and this method also falls within the scope of the present invention.

The second embodiment adopts two tables for determining an arithmetic bit region. It is also possible to adopt three or more tables and determine by S1 or S2 which of the tables is to be selected.

<Third Embodiment>

The third embodiment will be described. The third embodiment also implements a reversible visible digital watermark from which it is difficult to remove added noise.

In the first and second embodiments, when noise is to be multiplexed on a pixel of interest, the multiplexing region is determined by the visible intensities S1 and S2, and the region is comprised of 7 bits at maximum. In the third embodiment, the noise amount generated by arithmetic processing changes in accordance with not only the visible intensity values S1 and S2 but the pixel value of a region near a pixel of interest, eliminating the limitation.

Overall noise addition and removal processes are the same as those in FIGS. 1 and 2 according to the first and second embodiments, and a description thereof will be omitted. The first and second noise addition processes will be explained.

Figure 13:
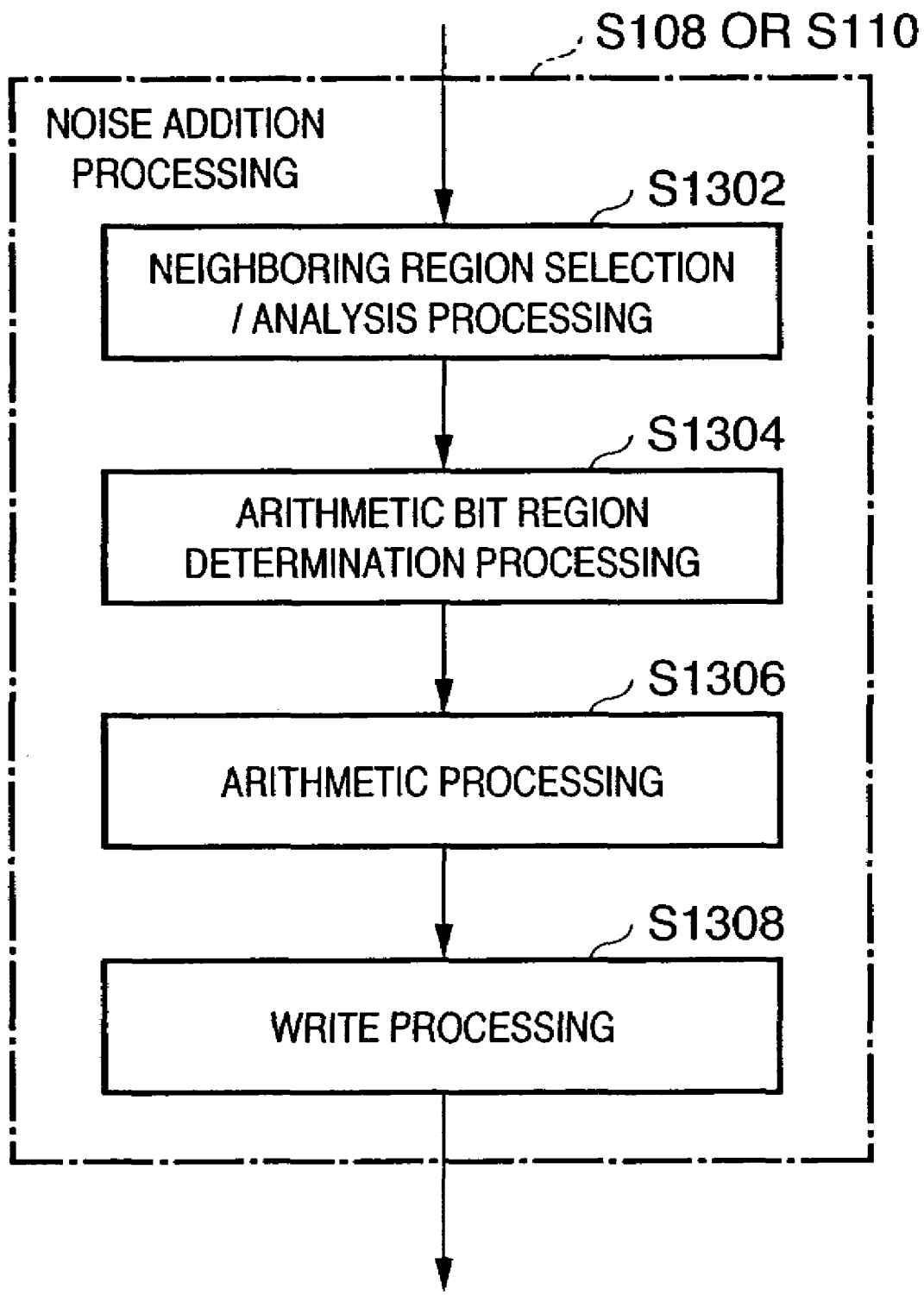
FIG. 13 is a flow chart showing noise addition processing according to the third embodiment.

FIG. 13 is a flow chart showing the processing procedures of noise addition processing (either of the first and second noise addition processes) according to the third embodiment. Noise addition processing according to the third embodiment is characterized in that the added noise amount changes in accordance with the visible intensity value and the value of an adjacent pixel serving as a neighboring region. Noise addition processing according to the third embodiment will be explained.

In noise addition processing, in step S1302, a region near an embedding target pixel is determined on the basis of an initially set neighboring region selection method NS. The pixel value in the neighboring region is analyzed in accordance with an initially set neighboring analysis method NA, generating a neighboring region analysis value. The neighboring region analysis value is comprised of a neighboring region pixel value serving as the predicted value of the embedding target pixel that is obtained from the neighboring region, and a neighboring region characteristic value containing the frequency characteristic of the neighboring region and the like.

In step S1304, an arithmetic bit region to be processed by arithmetic processing in step S1306 is determined on the basis of the neighboring region analysis value generated in step S1302 and the visible intensity value S (S1 or S2).

In step S1306, arithmetic processing is performed between the bit of the arithmetic bit region determined in step S1304 and a serial bit sequence generated from the random number key R input by initial setting. This arithmetic processing must be reversible. Arithmetic processing includes all reversible arithmetic processes such as exclusive-OR calculation, modulo addition, and modulo multiplication.

In step S1308, write processing of writing the value of the bit region of a corresponding input pixel in the output image W by the value of the processed arithmetic bit region is executed.

The outline of noise addition processing according to the third embodiment has been described.

Neighboring region analysis processing and a neighboring region analysis value will be explained in detail.

In the third embodiment, an arithmetic bit region subjected to arithmetic processing is determined on the basis of analysis of a neighboring region comprised of adjacent pixel values or the like in order to embed reversible noise in an embedding target pixel.

Generally in a natural image, the pixel values of adjacent pixels have a high correlation. That is, pixel values almost equal to each other are often assigned to adjacent pixels. In a natural image, a change amount between neighboring pixels that can be perceived by the human eye is proper as a change amount of an embedding target pixel that can be perceived by the human eye.

In the third embodiment, the maximum change amount Δmax of an embedding target pixel is finely set by referring to a neighboring pixel highly correlated to the embedding target pixel. Addition of noise which is perceived almost similarly at any grayscale of an original image is realized.

In the third embodiment, a region constituted by neighboring pixels which determine an arithmetic bit region for embedding reversible noise in an embedding target pixel will be called a neighboring region.

The neighboring region is constituted by one pixel in the third embodiment, but may be constituted by a plurality of pixels. The neighboring region suffices to be a region predicted to have a high correlation with an embedding target pixel. The neighboring region need not always be adjacent to the embedding target pixel, but desirably falls within a given distance.

Analysis of the pixel in the neighboring region may utilize not only a pixel value but also a statistical characteristic such as the frequency characteristic of a pixel value in the neighboring region or the variance of a pixel value in the neighboring region.

The arithmetic region determination table T_N in which the maximum change amount Δmax is set large at a high-frequency portion or in a texture region may be designed. In this case, reversible noise which can be easily, uniformly recognized by the human eye even in the high-frequency-component region or texture region can be added.

Neighboring region selection/analysis processing according to the third embodiment will be explained in detail.

Figure 18:
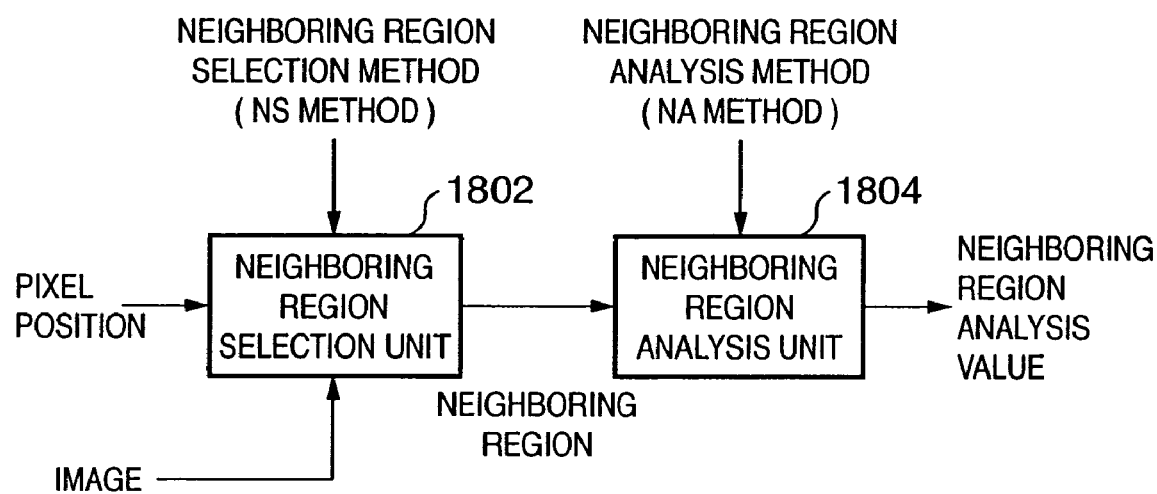
FIG. 18 is a block diagram showing the internal arrangement of a neighboring region selection/analysis unit which executes neighboring region selection/analysis processing.

FIG. 18 is a block diagram showing the internal arrangement of a neighboring region selection/analysis unit which executes neighboring region selection/analysis processing in step S1302 of FIG. 13. The neighboring region selection/analysis unit comprises a neighboring region selection unit 1802 and neighboring region analysis unit 1804.

The neighboring region selection unit 1802 receives image information (pixel position and pixel value), position information of an embedding target pixel, and the neighboring region selection method NS. The neighboring region selection unit 1802 determines a neighboring region on the basis of the pieces of input information. The neighboring region may not be fixed in the entire image, but may be changed in accordance with the pixel position or predetermined key information.

The neighboring region selection unit 1802 outputs neighboring region information (pixel position, pixel value, and the like) to the neighboring region analysis unit 1804 on the output stage.

The neighboring region analysis unit 1804 receives the neighboring region information (pixel position, pixel value, and the like) and the neighboring region analysis method NA, and analyzes the pixel value of the neighboring region on the basis of the pieces of input information. The neighboring region analysis unit 1804 outputs a neighboring region analysis value (neighboring region pixel value and neighboring region characteristic value).

Processing of the neighboring region selection/analysis means will be described in detail with reference to FIG. 15.

Figure 15:
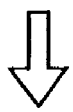
FIG. 15 is a view showing the relationship between an original image and a noise-multiplexed image according to the third embodiment.

FIG. 15 is a view showing the relationship between an 8-bit grayscale input image 1501 and an output image 1502 containing a visible digital watermark.

Pixels (pixels 13a, 14a, 15a, 18a, 19a, and 20a) surrounded by thick frames in FIG. 15 fall within the watermark image shape, and are pixels subjected to reversible noise embedding.

When the pixel 13a is a pixel of interest, the arithmetic bit region is selected on the basis of a region near the pixel 13a. The neighboring region is determined using the neighboring region selection unit 1802.

For example, the neighboring region selection unit 1802 selects the left adjacent pixel 12a (pixel value "112") is selected as a region near the pixel 13a (selection of a plurality of pixel regions as neighboring regions will be described later).

The pixel 12a (pixel value "112") is input to the neighboring region analysis unit 1804. In FIG. 15, for descriptive convenience, the neighboring region analysis unit 1804 directly outputs the input pixel value "112" as a neighboring region analysis value.

In arithmetic bit region determination processing, the arithmetic bit region of the embedding target pixel 13a is determined on the basis of the neighboring region analysis value obtained by the preceding neighboring region selection/analysis processing.

Arithmetic bit region determination processing will be explained in detail.

Figure 16:
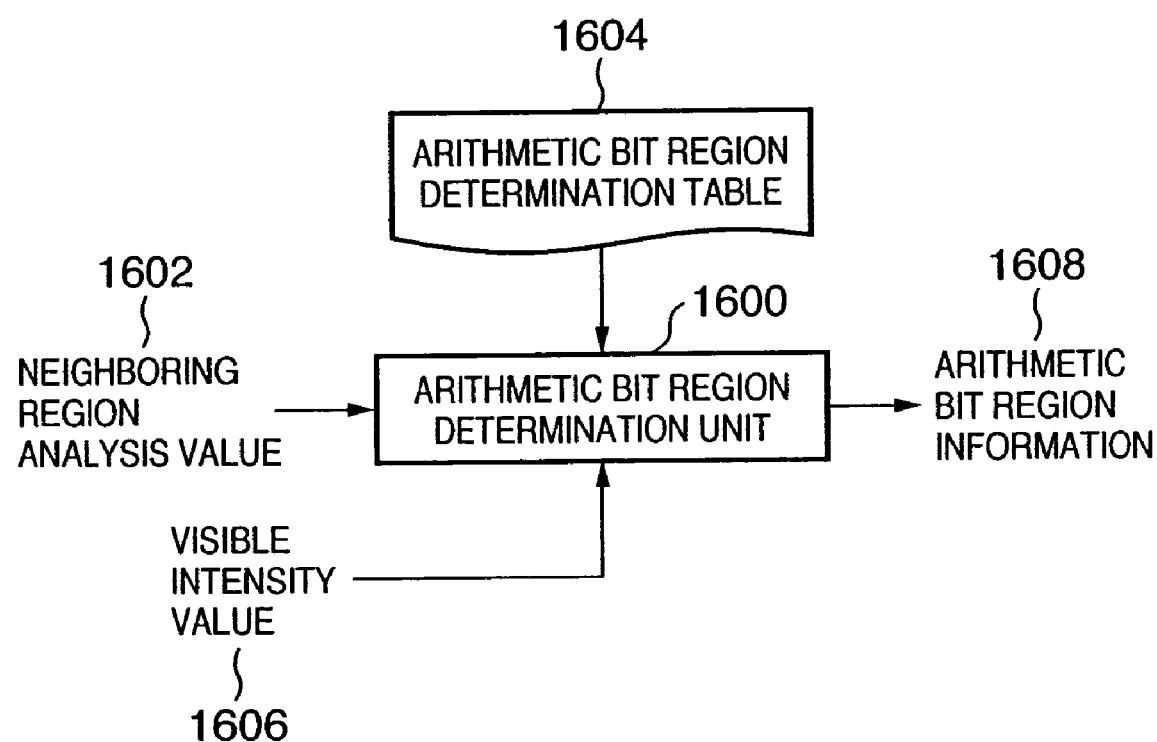
FIG. 16 is a block diagram showing the internal arrangement of an arithmetic bit region determination unit which executes arithmetic bit region determination processing according to the third embodiment.

FIG. 16 is a block diagram showing an arithmetic bit region determination unit which executes arithmetic bit region determination processing in step S1304.

An arithmetic bit region determination unit 1600 receives a neighboring region analysis value 1602 input from neighboring region selection/analysis processing in step S1302, an initially set visible intensity value S 1606, and an arithmetic bit region determination table T_N 1604.

The arithmetic bit region determination unit 1600 determines the arithmetic bit region of an embedding target pixel on the basis of the neighboring region analysis value 1602, arithmetic bit region determination table T_N 1604, and visible intensity value S 1606, and outputs the arithmetic bit region as arithmetic bit region information 1608.

The arithmetic bit region determination table T_N will be explained.

The arithmetic bit region determination table T_N is a lookup table used to determine an arithmetic bit region by arithmetic bit region determination processing in step S1304.

FIGS. 17A and 17B show examples of the arithmetic bit region determination table T_N which corresponds to the neighboring region analysis value (the pixel value of the pixel in the neighboring region). FIG. 17A shows a table for the visible intensity S1, and FIG. 17B shows a table for the visible intensity S2. Two tables are illustrated in FIGS. 17A and 17B, but it is also possible to use three or more tables and assign the visible intensities S1 and S2 information representing which of the tables is to be used.

In FIGS. 17A and 17B, reference numeral 1701 denotes a neighboring region analysis value (FIGS. 17A and 17B show only a neighboring region pixel value for descriptive convenience); 1702, an arithmetic bit region of an embedding target pixel that corresponds to the neighboring region analysis value (in FIGS. 17A and 17B, a bit position "Y" is an arithmetic bit region); and 1703, a maximum change amount Δmax calculated from the arithmetic bit region.

As described above, in the arithmetic bit region determination table T_N, the neighboring region analysis value (in FIGS. 17A and 17B, the neighboring region pixel value calculated from the neighboring region) and the visible intensity values S1 and S2 have values which correspond to the arithmetic bit region. The arithmetic bit region determination unit 1600 looks up the arithmetic bit region determination table T_N, and reads and outputs an arithmetic bit region which corresponds to the input neighboring region analysis value 1602 and visible intensity value S (1606).

In arithmetic processing of step S1306, bit arithmetic processing is executed between a serial bit sequence as shown in FIG. 5 and the bit of the arithmetic bit region in the arithmetic bit region determined by the above-described method. In write processing of step S1308, the arithmetic result in step S1306 is written in a corresponding arithmetic bit region of an output image.

Figure 14:
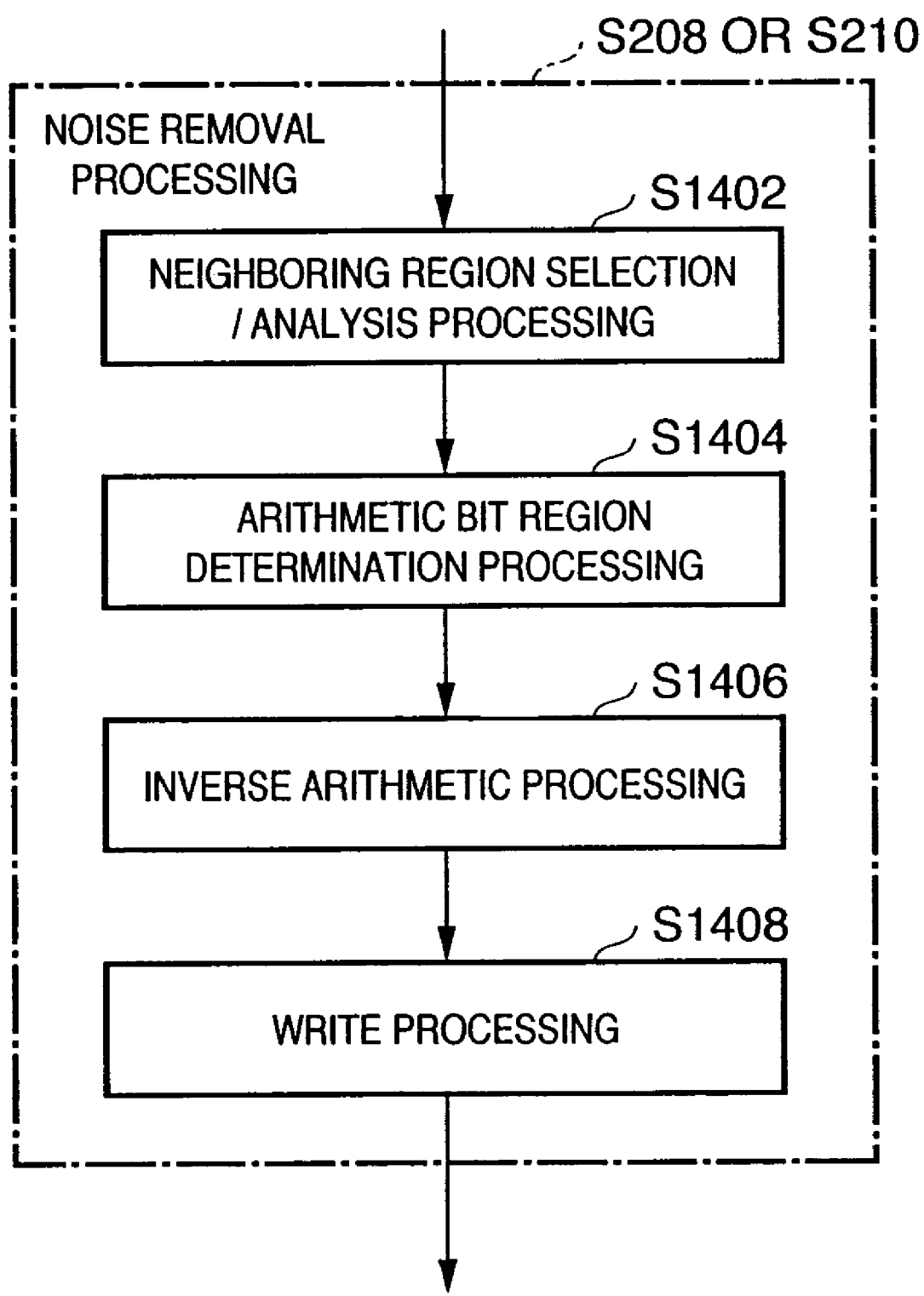
FIG. 14 is a flow chart showing noise removal processing according to the third embodiment.

The outline of noise removal processing according to the third embodiment will be briefly described with reference to FIG. 14.

In noise removal processing, in step S1402, a region near an embedding target pixel is determined on the basis of an initially set neighboring region selection method NS. The pixel value in the neighboring region is analyzed in accordance with an initially set neighboring analysis method NA, generating a neighboring region analysis value.

In step S1404, an arithmetic bit region to be processed by arithmetic processing in step S1406 is determined on the basis of the neighboring region analysis value generated in step S1402 and the visible intensity value S (S1 or S2).

In step S1406, inverse arithmetic processing is performed between the bit of the arithmetic bit region determined in step S1404 and a serial bit sequence generated from the random number key R input by initial setting. This arithmetic processing is inverse arithmetic processing (decoding processing) corresponding to arithmetic processing in embedding.

In step S1408, write processing of writing in a corresponding pixel of the output image E an arithmetic bit region value obtained by processing the value of the bit region of an input pixel is executed.

The operation of noise removal processing according to the third embodiment has been described.

To realize addition of completely reversible noise, several conditions are necessary for the neighboring region selection method. That is, in inverse arithmetic processing, an arithmetic bit region having undergone arithmetic processing in embedding must be correctly recognized. The neighboring region selection method must select a neighboring region so as to refer to the pixel value of a neighboring region used to determine an arithmetic bit region in inverse arithmetic processing (removal of reversible noise).

There are many neighboring region selection methods which satisfy the above conditions. When pixels subjected to embedding processing and removal processing are sequentially selected a left-to-right scanning direction, a pixel left adjacent to an embedding target pixel can be set as a neighboring region. Embedding and removal methods which do not require any original image will be exemplified.

Embedding will be briefly explained. The processing contents are the same regardless of the visible intensities S1 and S2, and processing for the visible intensity S1 will be described.

Assume that the embedding target pixel is the pixel 13a. In this situation, the left adjacent pixel 12a (pixel value "112") is a neighboring region, and thus selected and analyzed. As a result, "112" is output as the neighboring region pixel value of the neighboring region analysis value.

The arithmetic bit region determination table T_N (FIG. 17A) is searched for data "112", determining the arithmetic bit region of the pixel 13a. A pixel value "126" is calculated for the pixel 13a (pixel value "116") by arithmetic processing between the bit value of the arithmetic bit region of the pixel 13a and the serial bit sequence. The pixel value "126" is written in the pixel 13a of the output image 1502.

After that, the pixel 14a is processed (the pixel position of interest is shifted to a right adjacent pixel). The arithmetic bit region of the pixel 14a is determined using the arithmetic bit region determination table T_N by referring to the left adjacent pixel 13a (pixel value "116" before change) of the input image 1501. A pixel value "98" is calculated for the pixel 14a (pixel value "114") by arithmetic processing between the arithmetic bit region and the serial bit sequence. The pixel value "98" is written in the pixel 14a of the output image 1502.

This processing up to the end of one line is performed for respective lines, embedding (multiplexing) noise in the original image.

A step of removing noise added in the above-described way will be explained. For descriptive convenience, processing for the visible intensity S1 will be explained.

When the pixel 13a (pixel with a pixel value "126" after noise addition) is a removal target pixel, the left adjacent pixel 12a (which is a pixel having undergone reconstruction processing) with a pixel value "112" in the output image 1502 is selected and analyzed as a neighboring region. As a result, "112" is output as the neighboring region pixel value of the neighboring region analysis value.

The arithmetic bit region of the pixel 13a is determined using the arithmetic bit region determination table T_N (FIG. 17A). A restored pixel value "116" is calculated for the pixel 13a (pixel value "126" after watermark embedding) by arithmetic processing between the bit value of the arithmetic bit region and the serial bit sequence, and the pixel value "116" is written in the pixel 13a of the output image 1501 (original image).

When the pixel 14a is a removal target pixel, not the left adjacent pixel 13a of the input image 1501 but the left adjacent pixel 13a (restored pixel value "116") of the reconstructed output image 1502 is selected and analyzed. Consequently, "116" is output as the neighboring region pixel value of the neighboring region analysis value.

The arithmetic bit region of the pixel 14a is determined using the arithmetic bit region determination table T_N. A restore pixel value "114" is calculated for the pixel 14a (pixel value "98") by arithmetic processing between the bit value of the arithmetic bit region and the serial bit sequence, and the pixel value "114" is written in the pixel 14a of the output image 1501 (original image).

In this fashion, the pixel values of adjacent pixels having undergone reconstruction processing are sequentially selected and analyzed, determining the same arithmetic bit region as that in embedding and completely removing added noise.

In the above description, a pixel left adjacent to an embedding target pixel is selected as a neighboring region for descriptive convenience. Alternatively, a pixel at the same position on an immediately preceding line in the main scanning direction may be selected. In short, a neighboring region to be referred to suffices to have undergone reconstruction processing.

As will be described below, a region of a plurality of pixels may be selected and analyzed as a neighboring region.

For example, the neighboring region selection unit selects the pixels 7a, 8a, and 12a as a region near the pixel 13a. The neighboring region analysis unit predicts the pixel value (e.g., average value) of the embedding target pixel 13a from the pixel values of the pixels 7a, 8a, and 12a, and sets the predicted value as a neighboring region pixel value.

Alternatively, the neighboring region selection unit may select four upper left pixels 1a, 2a, 6a, and 7a as a region near the pixel 13a. In this case, the neighboring region analysis unit may also calculate a variance, frequency coefficient, and the like in the neighboring region, and set them as neighboring region characteristic values. An arithmetic bit region corresponding to the variance, frequency coefficient, and the like is defined in the arithmetic bit region determination table T_N.

The above description assumes that one line is scanned in a left-to-right direction and respective lines are scanned in a top-to-bottom direction. However, the scanning direction is not limited to them.

In the arithmetic bit region determination table T_N in FIGS. 17A and 17B, the arithmetic bit region corresponding to an input pixel value "112" as a neighboring region analysis value (neighboring region pixel value) is defined by B4, B3, and B1. At this time, the maximum change amount ($\Delta$max) is calculated into $2^4+2^3+2^1=26$. For example, when the pixel value of an embedding target pixel is 112, B4, B3, and B1 of 112 are 1, 0, and 0. The change amount has a width of $2^3+2^1=10$ in the positive direction and $2^4=16$ in the negative direction.

The noise addition method of the third embodiment can finely set an arithmetic bit region on the basis of a neighboring region pixel value almost equal to the value of an embedding target pixel and a neighboring region analysis value obtained from a neighboring region characteristic value near the embedding target pixel.

Addition of reversible noise to all the pixels of an input image by using the noise addition method of the third embodiment will be described.

As is apparent from the above description, when the neighboring region is a pixel left to a pixel of interest, no neighboring region exists for the start pixel of each line. Several examples of a method coping with the absence of any neighboring region will be explained.

For example, when a pixel having no neighboring region near the edge of an input image is an embedding target pixel, addition of noise may stop. In removing noise from the pixel having no neighboring region, it is known that no noise is added. Removal of noise need not be executed until the neighboring region is obtained.

When a pixel having no neighboring region near the edge of an input image is an embedding target pixel, arithmetic bit processing may be done for a fixed arithmetic bit region determined only in accordance with the visible intensity value S. In removing noise from the pixel having no neighboring region, inverse arithmetic processing is performed for the arithmetic bit region determined only in accordance with the visible intensity value S, thereby removing noise.

As described in detail above, an arithmetic bit region is determined in accordance with the neighboring region analysis value for the pixel value of an input image which attains the size of a neighboring region determined by the neighboring region selection method NS.

The human visual characteristic is more sensitive to a change in luminance value at a lower luminance value and less sensitive to a change in luminance value at a higher luminance value. The arithmetic bit region (maximum change amount $\Delta$max) is preferably designed in consideration of the human visual characteristic.

As described in the first embodiment, the uniform color space is also effective for determining the arithmetic bit region (maximum change amount $\Delta$max).

The third embodiment can set the pixel value change amount such that the noise amount added by arithmetic processing changes in accordance with the image grayscale in a region represented by watermark image shape information of an original image while maintaining the feature of an original image.

As described above, noise addition processing according to the third embodiment requires a reconstructed neighboring region in noise removal processing.

From this, after noise addition processing described in the third embodiment is executed inside the watermark image shape, noise is added outside the watermark image shape by using noise addition processing described in the first or second embodiment. This makes it more difficult to remove noise inside the watermark image shape without removing noise outside the watermark image shape. Noise removal inside the watermark image shape requires key information for removing noise inside the watermark image shape and key information for removing noise outside the watermark image shape.

The arithmetic bit region determination table T_N is used to determine an arithmetic bit region. An arithmetic bit region determination function F expressed by a formula can also be used, and this method also falls within the scope of the present invention.

<Fourth Embodiment>

The first to third embodiments assume embedding for each pixel. The fourth embodiment will describe a case wherein a visible digital watermark is embedded in an image compression-coded by JPEG, JPEG 2000, or the like.

A compression coding method such as JPEG or JPEG 2000 does not define an input color component. In many cases, R (Red), G (Green), and B (Blue) color components are transformed into Y (luminance), Cb (color difference), and Cr (color difference), and then discrete cosine transform or discrete wavelet transform is executed.

A frequency conversion coefficient representing the luminance component of a color image compression-coded by JPEG or JPEG 2000 is used as a visible digital watermark embedding component. Such component can be embedded in a luminance value without any special processing.

In JPEG compression coding, compression coding is performed for each block. For example, a JPEG-compression-coded image has a minimum encoding unit (in general, 8×8 pixels), and basic compression coding processing is done for each unit. To embed a visible digital watermark in a JPEG-compression-coded image, watermark image shape information is set not for each pixel but for the minimum encoding unit. This facilitates applying the methods of the first to third embodiments.

More specifically, in order to transform an image into frequency component data for each 8×8 pixel block, DCT transform is performed. Whether the pixel block falls within region "0" of image shape information is determined. If the pixel block is determined to fall within region "1", the first noise addition processing according to the first to third embodiments is performed for a bit which constitutes a DC value obtained as a result of DCT transform. If the pixel block is determined to fall within region "0", the second noise addition processing according to the first to third embodiments is performed.

Figure 19:
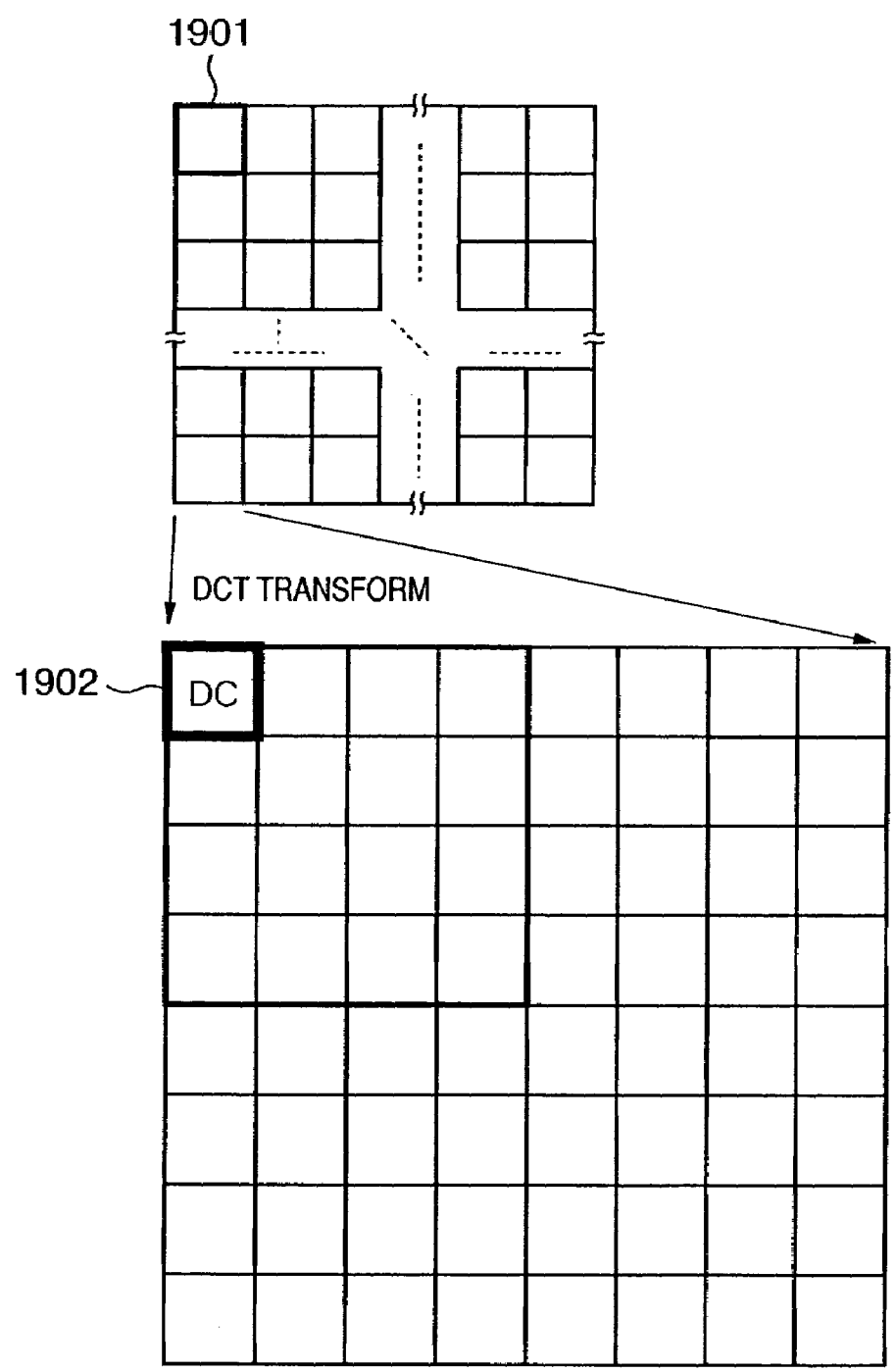
FIG. 19 is a view showing a minimum encoding unit in JPEG compression coding.

In FIG. 19, reference numeral 1901 denotes an image block in the minimum encoding unit in JPEG compression coding. For a JPEG-compression-coded image, DCT (Discrete Cosine Transform) is executed within the minimum encoding unit (1901). Reference numeral 1902 denotes a DCT coefficient obtained for the minimum encoding unit. The DCT coefficient is comprised of a DC component (average value) and an AC component (frequency component).

The average value in the minimum encoding unit (1901) can be changed by performing arithmetic bit region calculation processing described in the first embodiment for the DC component of the DC coefficient in the minimum encoding unit. A visible digital watermark can be embedded for each block.

Assuming that watermark image shape information is information which designates a minimum encoding unit block subjected to embedding, the first to third embodiments can be applied.

When the fourth embodiment is applied to the third embodiment, e.g., the DC component of a pixel block left adjacent to a pixel block of interest is referred to as a neighboring region to be referred to.

After noise is multiplexed on the DCT-transformed DC component of each pixel block, known encoding processing is done to encode the block. In JPEG compression coding, data is discarded to a certain degree by quantization processing. Quantization processing generally has a predetermined quantization step (e.g., 2 or 4), and the LSB or several bits from the LSB to an upper bit are removed. In multiplexing noise, removed bits are excluded from the arithmetic bit region regardless of the visible intensities S1 and S2.

In removing noise, inverse quantization is done, and a resultant DC component is processed as a pixel of interest in the first to third embodiments. When the fourth embodiment is applied to the third embodiment, e.g., the DC component of a left adjacent decoded pixel block is adopted as a neighboring region. In the application to the third embodiment, the processing unit is 8×8 pixels. When the pixel block is located at the left edge, no neighboring region exists. In noise embedding and noise removal, the pixel block is processed using a fixed arithmetic bit region without referring to any neighboring region.

On the other hand, a JPEG 2000-compression-coded image is compression-coded by dividing the image stepwise by the band from a low frequency to a high frequency by using DWT (Discrete Wavelet Transform) while holding image shape information.

Figure 20:
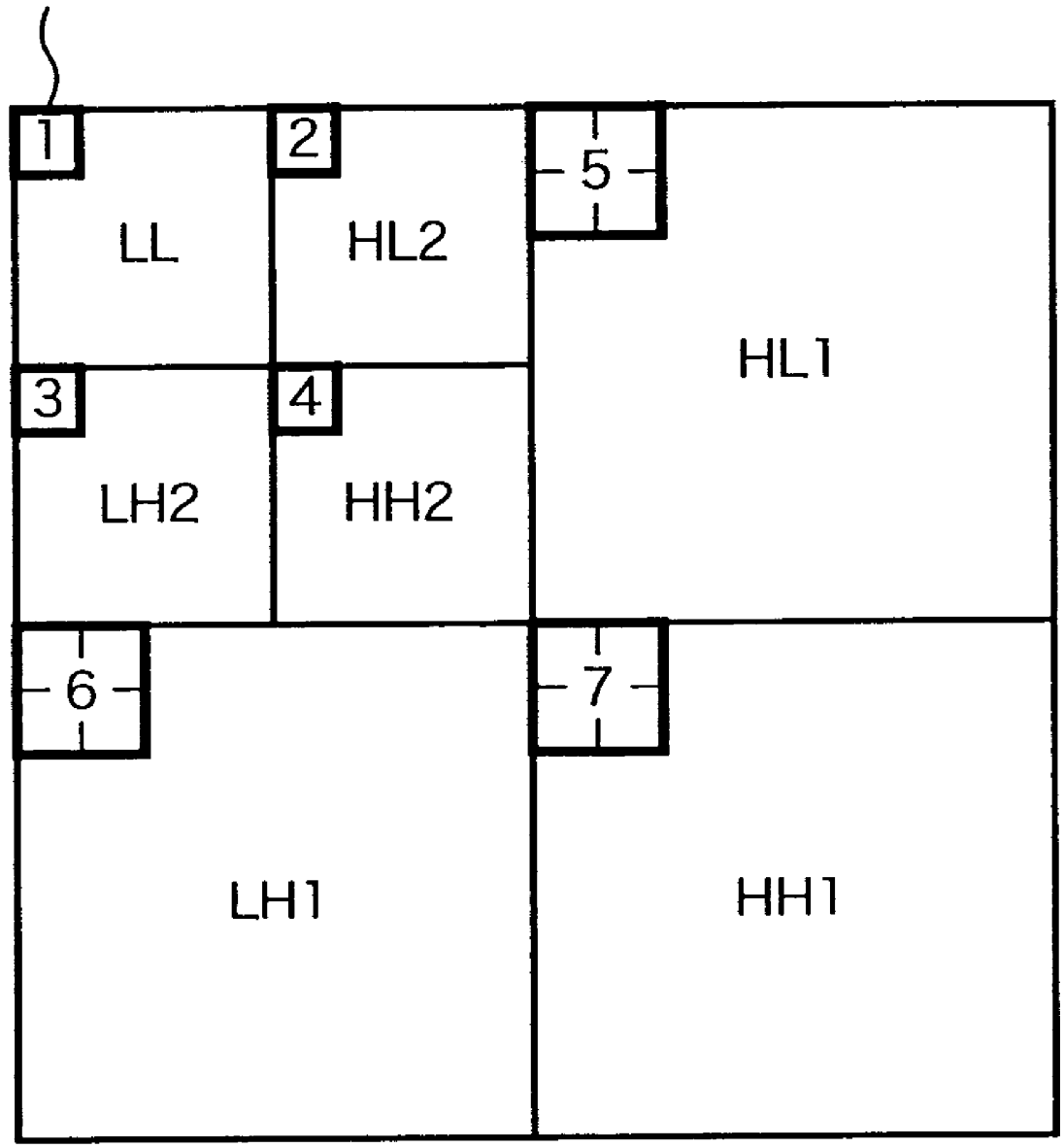
FIG. 20 is a view showing band division by discrete wavelet transform in JPEG 2000 compression coding.

FIG. 20 is a view showing band division by discrete wavelet transform in JPEG 2000 compression coding.

In discrete wavelet transform, low frequency image components which greatly influence an image concentrate on LL, and LL satisfactorily holds the image feature of an original image. If an element used for embedding is the low frequency component (LL) of DWT (Discrete Wavelet Transform), a visible digital watermark can be embedded relatively similar to the first to third embodiments.

In FIG. 20, LL is a low-frequency-component subblock as a result of performing DWT twice. All pixels which constitute the subblock undergo the same embedding as that in the first to third embodiments.

When the methods described in the first to third embodiments are applied to the DWT (Discrete Wavelet Transform) coefficient of a JPEG 2000-compression-coded image, an arithmetic bit region determination table must be designed in consideration of the fact that the DWT coefficient takes a positive or negative value.

When the first embodiment is applied to JPEG 2000 compression coding, a DWT coefficient subjected to noise addition processing may be selected from a tree structure in accordance with the visible intensity value. When the quantization step is set for each subband, the quantized DWT coefficient is processed to add reversible noise.

Also, the following method can be employed.

In FIG. 21, reference numeral 2101 denotes a DWT coefficient string obtained by extracting from each subband a DWT coefficient which satisfies the relationship between LL at a predetermined position and the tree structure in FIG. 20; and 2102, a table representing the relationship between the visible intensity value and the DWT coefficient subjected to noise addition processing. In the table 2102, the DWT coefficient subjected to noise addition processing also changes depending on the visible intensity value. Noise addition processing to LL may be done after a determination bit is set to determine an arithmetic bit region, similar to the second embodiment. The DWT coefficients of remaining subbands may undergo noise addition processing by using an arithmetic bit region as a fixed value.

In a JPEG 2000-compression-coded image, a 1-bit bit plane having the same size as the image size is prepared for ROI (Region Of Interest). (A JPEG 2000 basic encoding system shifts up and encodes only ROI.)

When watermark image shape information is to be presented as a watermark image to the image appreciator in the absence of any ROI, the watermark image shape information may be set in ROI.

For example, visible logotype information representing copyright information is described in ROI. In transmitting image information by content delivery, the logotype information can be first presented to the appreciator, explicitly presenting the copyright holder of the content to the user.

Watermark image shape information has been encoded together with an image as ROI information. Key information necessary to remove a visible digital watermark can be reduced.

Watermark image shape information necessary to remove a visible digital watermark can also be attached to a predetermined position such as the header of an image file. Reconstruction of an image containing the visible digital watermark into an original image requires only necessary key information in addition to the image file, reducing the delivered information amount.

A key (and watermark image shape information) necessary to remove a visible digital watermark has a relatively small information amount, and can be attached to a predetermined position such as the header of an image file. In order to enable only a specific user to remove a visible digital watermark, the key (and watermark image shape information) may be encrypted by predetermined cryptography (e.g., public key cryptography), and attached to a predetermined position such as the header of an image file.

The first to third embodiments have described only an exclusive-OR (XOR calculation) as cryptography. The present invention can also adopt secret key cryptography such as DES or public key cryptography by collecting a plurality of arithmetic bit regions into a predetermined processing unit (e.g., 64 bits).

In the use of secret key cryptography such as DES belonging to block cryptography of performing processing for each predetermined processing unit, if the number of collected bits does not reach a predetermined processing unit, "0"s or "1"s are padded by a necessary number of bits to satisfy the predetermined unit and then encryption is performed. A bit which cannot be stored at an original pixel position may be attached to a predetermined file position such as a header.

Alternatively, cryptography belonging to stream cryptography (belonging to secret key cryptography) capable of processing for one to several bits may be employed.

In this case, in the first to third embodiments, not a random number key, but a secret key for secret key cryptography, or a public key in embedding and private key in extraction for public key cryptography are input by initial setting.

The fourth embodiment has exemplified DES as cryptography, but may adopt another secret key cryptography such as AES, FEAL, IDEA, RC2, RC4, RC5, MISTY, Caesar cryptography, Viginere cryptography, Beaufort cryptography, Playfair cryptography, Hill cryptography, or Vernam cryptography.

The fourth embodiment has exemplified a still image, but the same principle can also be applied to a moving image. For example, in MPEG compression coding, a visible digital watermark can be relatively easily embedded using an intermediate frame as an embedding target. In Motion JPEG 2000, a visible digital watermark can be repetitively embedded by the same method as that of JPEG 2000 compression coding in the time frame direction. Hence, application of a visible digital watermark to a moving image also falls within the scope of the present invention.

<Description of Noise-Multiplexed Sample>

A sample in which a visible digital watermark is embedded by noise addition processing described in the first embodiment will be described.

Each image is originally a multilevel image, i.e., a grayscale image in which one pixel is comprised of many bits. However, drawings attached to a patent specification provide not multilevel images but only binary images. Each image to be described later is not a noise-multiplexed multilevel grayscale image, but shows a result of binarizing it by error diffusion processing.

FIG. 23 shows an 8-bit grayscale image (original image) of 640 horizontal pixels×480 vertical pixels. FIG. 24 shows an image in which a watermark image shape shown in FIG. 22 is embedded in the original image in FIG. 23.

In FIG. 24, bit positions except the MSB constitute an arithmetic bit region inside the watermark image shape. Bit positions except the MSB, B6, and B5 constitute an arithmetic bit region outside the watermark image shape. XOR calculation is executed between the arithmetic bit region and a serial bit sequence generated from a key. Each bit is replaced with the calculation result, generating an image (FIG. 24) containing a visible digital watermark.

Many upper bits remain outside the watermark image shape in FIG. 24, maintaining the grayscale. However, only the MSB remains inside the watermark image shape, resulting in an image poor in grayscale. Although the entire image has undergone arithmetic processing, the noise amount is different inside and outside the watermark image shape. The image appreciator can clearly see the watermark image shape information.

As is apparent from the above embodiments, most of the embodiments can be realized by software. In general, when a computer program is installed into a general-purpose information processing apparatus such as a personal computer, a computer-readable storage medium such as a floppy® disk, CD-ROM, or semiconductor memory card is set in the apparatus to execute an install program or copy the program to the system. Such computer-readable storage medium also falls within the scope of the present invention.

An OS or the like running on the computer performs part or all of processing. Alternatively, program codes read out from the storage medium are written in the memory of a function expansion board inserted into the computer or the memory of a function expansion unit connected to the computer, and the CPU of the function expansion board or function expansion unit performs part or all of processing on the basis of the instructions of the program codes. Also in this case, functions equal to those of the embodiments can be realized, the same effects can be obtained, and the objects of the present invention can be achieved.

As described above, according to the embodiments, an image, key, and watermark image shape information are input, and the element value of the building element of the image is selected. If the value falls inside the watermark image shape information, the first noise addition processing is executed for the element value of the building element. If the value falls outside the watermark image shape information, the second noise addition processing is executed for the element value of the building element. As a result, a visible digital watermark is embedded in the image. The embedded visible digital watermark makes it difficult to remove part of the visible digital watermark by a value calculated on the basis of surrounding pixel values by analyzing pixels around the region where the visible digital watermark is embedded. Added noise can be visually changed between the first and second noise addition processes, explicitly presenting the visible digital watermark to the image appreciator.

As has been described above, the present invention can multiplex noise on an original image to reversibly embed visible additional information with a noise-multiplexed distribution, and can generate an image highly resistant to noise removal.

Another aspect of the present invention can remove additional information from an image on which visible addition information is multiplexed, thereby reconstructing an original image or an image almost identical to the original image.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus which multiplexes noise on a multilevel image data to embed visible additional information with a noise-multiplexed distribution, comprising:
    first noise multiplexing means for multiplexing noise at a first visible intensity;
    second noise multiplexing means for multiplexing noise at a second visible intensity different from the first visible intensity;
    input means for inputting, as the additional information for a predetermined pixel region unit, information representing which of the first and second visible intensities is used for multiplexing;
    determination means for determining on the basis of the additional information which of the first and second visible intensities is used for multiplexing in a pixel region of interest in multilevel image data; and
    control means for selecting either of said first and second noise multiplexing means for the pixel region of interest on the basis of a determination result of said determination means, and causing selected noise multiplexing means to multiplex noise.

2. The apparatus according to claim 1, wherein each of said first and second noise multiplexing means determines an arithmetic bit region subjected to noise multiplexing in the pixel region of interest on the basis of a supplied visible intensity, and performs reversible logical calculation of noise bit information by a random number for the determined arithmetic bit region, thereby multiplexing noise.

3. The apparatus according to claim 2, wherein the arithmetic bit region is determined by further referring to data of the predetermined pixel region.

4. The apparatus according to claim 1, wherein each of said first and second noise multiplexing means determines an arithmetic bit region subjected to noise multiplexing in the pixel region of interest on the basis of data of a region near the pixel region of interest and a supplied visible intensity, and performs reversible logical calculation of noise bit information by a random number for the determined arithmetic bit region, thereby multiplexing noise.

5. The apparatus according to claim 1, wherein the predetermined pixel region includes a single pixel.

6. The apparatus according to claim 1, wherein the predetermined pixel region includes a pixel block of a predetermined size.

7. The apparatus according to claim 1, wherein the predetermined pixel region includes a DC component obtained by orthogonal transform in JPEG compression coding.

8. The apparatus according to claim 1, wherein the predetermined pixel region includes a low-frequency-component block obtained by wavelet transform in JPEG 2000 compression coding.

9. An image processing apparatus which removes visible additional information from multilevel image data in which noise is reversibly embedded to multiplex the visible additional information, comprising:
    first noise removal means for removing noise multiplexed at a first visible intensity;
    second noise removal means for removing noise multiplexed at a second visible intensity different from the first visible intensity;
    input means for inputting, as the additional information for a predetermined pixel region unit, information representing which of the first and second visible intensities is used for multiplexing;
    determination means for determining on the basis of the additional information which of the first and second visible intensities is used for multiplexing in a pixel region of interest in multilevel image data; and
    control means for selecting either of said first and second noise removal means for the pixel region of interest on the basis of a determination result of said determination means, and removing multiplexed noise.

10. An image processing method of multiplexing noise on multilevel image data to embed visible additional information with a noise-multiplexed distribution, comprising:
    a first noise multiplexing step of multiplexing noise at a first visible intensity;
    a second noise multiplexing step of multiplexing noise at a second visible intensity different from the first visible intensity;
    an input step of inputting, as the additional information for a predetermined pixel region unit, information representing which of the first and second visible intensities is used for multiplexing;
    a determination step of determining on the basis of the additional information which of the first and second visible intensities is used for multiplexing in a pixel region of interest in multilevel image data; and
    a control step of selecting either of the first and second noise multiplexing steps for the pixel region of interest on the basis of a determination result in the determination step, and multiplexing noise.

11. An image processing method of removing visible additional information from multilevel image data in which noise is reversibly embedded to multiplex the visible additional information, comprising:
 a first noise removal step of removing noise multiplexed at a first visible intensity;
 a second noise removal step of removing noise multiplexed at a second visible intensity different from the first visible intensity;
 an input step of inputting, as the additional information for a predetermined pixel region unit, information representing which of the first and second visible intensities is used for multiplexing;
 a determination step -of determining on the basis of the additional information which of the first and second visible intensities is used for multiplexing in a pixel region of interest in multilevel image data; and
 a control step of selecting either of the first and second noise removal steps for the pixel region of interest on the basis of a determination result in the determination step, and removing multiplexed noise.

12. A computer program embodied in a computer-readable medium functioning as an image processing apparatus which multiplexes noise on multilevel image data to embed visible additional information with a noise-multiplexed distribution, functioning as:
 first noise multiplexing means for multiplexing noise at a first visible intensity;
 second noise multiplexing means for multiplexing noise at a second visible intensity different from the first visible intensity;
 input means for inputting, as the additional information for a predetermined pixel region unit, information representing which of the first and second visible intensities is used for multiplexing;
 determination means for determining on the basis of the additional information which of the first and second visible intensities is used for multiplexing in a pixel region of interest in multilevel image data; and
 control means for selecting either of said first and second noise multiplexing means for the pixel region of interest on the basis of a determination result of said determination means, and causing selected noise multiplexing means to multiplex noise.

13. A computer-readable storage medium storing a computer program defined in claim 12.

14. A computer program embodied in a computer-readable medium functioning as an image processing apparatus which removes visible additional information from multilevel image data in which noise is reversibly embedded to multiplex the visible additional information, functioning as:
 first noise removal means for removing noise multiplexed at a first visible intensity;
 second noise removal means for removing noise multiplexed at a second visible intensity different from the first visible intensity;
 input means for inputting, as the additional information for a predetermined pixel region unit, information representing which of the first and second visible intensities is used for multiplexing;
 determination means for determining on the basis of the additional information which of the first and second visible intensities is used for multiplexing in a pixel region of interest in multilevel image data; and
 control means for selecting either of said first and second noise removal means for the pixel region of interest on the basis of a determination result of said determination means, and removing multiplexed noise.

15. A computer-readable storage medium storing a computer program defined in claim 14.

* * * * *

UNITED STATES PATENT AND TRADEMARK OFFICE
CERTIFICATE OF CORRECTION

PATENT NO. : 7,200,242 B2  Page 1 of 1
APPLICATION NO. : 10/600620
DATED : April 3, 2007
INVENTOR(S) : Tomochika Murakami It is certified that error appears in the above-identified patent and that said Letters Patent is hereby corrected as shown below:

| | | |
|---|---|---|
| Title Page | (56) References Cited | Foreign Patent Documents |
| | "EP 0 725 529 A2  6/1996" should be deleted. | |
| Col. 5, line 16, | "in" should read --in- --. | |
| Col. 6, line 42, | "suffices" should read --suffice--. | |
| Col. 9, line 37, | "parameter." should read --parameter--. | |
| line 46, | "onside" should read --inside--. | |
| Col. 10, line 31, | "and B6)" should read --and (B6))--. | |
| Col. 23, line 44, | "a" should be deleted. | |
| Col. 25, line 16, | "-of" should be deleted. | |

Signed and Sealed this

Fifteenth Day of April, 2008

JON W. DUDAS
*Director of the United States Patent and Trademark Office*